United States Patent
Geisner et al.

(10) Patent No.: US 9,122,053 B2
(45) Date of Patent: Sep. 1, 2015

(54) REALISTIC OCCLUSION FOR A HEAD MOUNTED AUGMENTED REALITY DISPLAY

(75) Inventors: Kevin A. Geisner, Mercer Island, WA (US); Brian J. Mount, Seattle, WA (US); Stephen G. Latta, Seattle, WA (US); Daniel J. McCulloch, Kirkland, WA (US); Kyungsuk David Lee, Redmond, WA (US); Ben J. Sugden, Woodinville, WA (US); Jeffrey N. Margolis, Seattle, WA (US); Kathryn Stone Perez, Kirkland, WA (US); Sheridan Martin Small, Seattle, WA (US); Mark J. Finocchio, Redmond, WA (US); Robert L. Crocco, Jr., Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 390 days.

(21) Appl. No.: 13/443,368

(22) Filed: Apr. 10, 2012

(65) Prior Publication Data
US 2012/0206452 A1    Aug. 16, 2012

Related U.S. Application Data

(63) Continuation-in-part of application No. 12/905,952, filed on Oct. 15, 2010, now Pat. No. 8,884,984.

(51) Int. Cl.
*G06T 17/00*    (2006.01)
*G02B 27/01*    (2006.01)
(Continued)

(52) U.S. Cl.
CPC .............. *G02B 27/017* (2013.01); *G06F 3/011* (2013.01); *G06F 3/013* (2013.01);
(Continued)

(58) Field of Classification Search
USPC ......................................................... 345/428
See application file for complete search history.

(56) References Cited

U.S. PATENT DOCUMENTS 6,330,281 B1    12/2001    Mann et al.
6,466,207 B1    10/2002    Gortler et al.
(Continued)

FOREIGN PATENT DOCUMENTS

CN    1452071 A    10/2003
CN    1627237 A    6/2005
(Continued)

OTHER PUBLICATIONS

Luebke, et al., Chapter 1 Introduction, pp. 3-17, Level of Detail for 3D Graphics, Book, Morgan Kaufmann Publishers, Elsevier Science Inc., New York, NY, USA, Aug. 5, 2002, 15 pages.
(Continued)

*Primary Examiner* — Peter Hoang
(74) *Attorney, Agent, or Firm* — Heikki Einola; Judy Yee; Micky Minhas

(57) ABSTRACT

Technology is described for providing realistic occlusion between a virtual object displayed by a head mounted, augmented reality display system and a real object visible to the user's eyes through the display. A spatial occlusion in a user field of view of the display is typically a three dimensional occlusion determined based on a three dimensional space mapping of real and virtual objects. An occlusion interface between a real object and a virtual object can be modeled at a level of detail determined based on criteria such as distance within the field of view, display size or position with respect to a point of gaze. Technology is also described for providing three dimensional audio occlusion based on an occlusion between a real object and a virtual object in the user environment.

20 Claims, 20 Drawing Sheets

(51) Int. Cl.
G06F 3/01 (2006.01)
G06T 19/00 (2011.01)
G06K 9/00 (2006.01)

(52) U.S. Cl.
CPC ....... *G06K 9/00214* (2013.01); *G06K 9/00335* (2013.01); *G06K 9/00671* (2013.01); *G06T 19/006* (2013.01); *G02B 2027/014* (2013.01); *G02B 2027/0127* (2013.01); *G02B 2027/0138* (2013.01); *G02B 2027/0178* (2013.01)

(56) References Cited

U.S. PATENT DOCUMENTS

| | | | |
|---|---|---|---|
| 6,525,731 | B1 | 2/2003 | Suits et al. |
| 6,674,877 | B1 | 1/2004 | Jojic et al. |
| 6,795,090 | B2 | 9/2004 | Cahill et al. |
| 6,956,566 | B2 | 10/2005 | Gelb |
| 7,372,977 | B2 | 5/2008 | Fujimura et al. |
| 7,583,275 | B2 | 9/2009 | Neumann et al. |
| 7,605,826 | B2 | 10/2009 | Sauer |
| 7,812,815 | B2 | 10/2010 | Banerjee et al. |
| 7,957,584 | B2 | 6/2011 | Najafi et al. |
| 2003/0067536 | A1 | 4/2003 | Boulanger et al. |
| 2004/0239670 | A1 | 12/2004 | Marks |
| 2005/0024388 | A1 | 2/2005 | Takemoto |
| 2005/0083248 | A1 | 4/2005 | Biocca et al. |
| 2008/0024597 | A1 | 1/2008 | Yang et al. |
| 2008/0150965 | A1 | 6/2008 | Bischoff et al. |
| 2008/0246759 | A1 | 10/2008 | Summers |
| 2008/0284864 | A1 | 11/2008 | Kotake et al. |
| 2009/0221368 | A1 | 9/2009 | Yen et al. |
| 2010/0083140 | A1 | 4/2010 | Dawson et al. |
| 2010/0091096 | A1 | 4/2010 | Oikawa et al. |
| 2010/0164990 | A1 | 7/2010 | Van Doorn |
| 2010/0238161 | A1 | 9/2010 | Varga et al. |
| 2010/0328344 | A1 | 12/2010 | Mattila et al. |
| 2011/0075257 | A1 | 3/2011 | Hua et al. |
| 2011/0116684 | A1 | 5/2011 | Coffman |
| 2011/0231757 | A1 | 9/2011 | Haddick et al. |
| 2011/0292076 | A1 | 12/2011 | Wither et al. |
| 2012/0001901 | A1 | 1/2012 | Park |
| 2012/0075167 | A1* | 3/2012 | Lahcanski et al. ........ 345/8 |
| 2012/0092328 | A1 | 4/2012 | Flaks et al. |
| 2012/0105473 | A1 | 5/2012 | Bar-Zeev et al. |

FOREIGN PATENT DOCUMENTS

| | | |
|---|---|---|
| CN | 101510189 A | 8/2009 |
| CN | 101673161 A | 3/2010 |
| KR | 101032813 B1 | 5/2011 |

OTHER PUBLICATIONS

Luebke, et al., Chapter 2 Mesh Simplification, pp. 19-38, Level of Detail for 3D Graphics, Book, Morgan Kaufmann Publishers, Elsevier Science Inc., New York, NY, USA, Aug. 5, 2002, 20 pages.
Luebke, et al., Chapter 4 Run-Time Frameworks, Section 4.1 "LOD Selection Factors," pp. 87-96, Level of Detail for 3D Graphics, Book, Morgan Kaufmann Publishers, Elsevier Science Inc., New York, NY, USA, Aug. 5, 2002, 10 pages.
Luebke, et al., Chapter 4 Run-Time Frameworks, Section 4.3 "View-Dependent LOD," pp. 104-114, Level of Detail for 3D Graphics, Book, Morgan Kaufmann Publishers, Elsevier Science Inc., New York, NY, USA, Aug. 5, 2002, 11 pages.
Luebke, et al., Chapter 4 Run-Time Frameworks, Section 4.4 "Blending Between Transitions," pp. 114-118, Level of Detail for 3D Graphics, Book, Morgan Kaufmann Publishers, Elsevier Science Inc., New York, NY, USA, Aug. 5, 2002, 5 pages.
Luebke, et al., Chapter 6 Gaming Optimizations, Section 6.4 "Classic LOD Suitability to Games," pp. 163-170, Level of Detail for 3D Graphics, Book, Morgan Kaufmann Publishers, Elsevier Science Inc., New York, NY, USA, Aug. 5, 2002, 8 pages.
Luebke, et al., Chapter 6 Gaming Optimizations, Section 6.5 "NonGeometric Level of Detail," pp. 171-175, Level of Detail for 3D Graphics, Book, Morgan Kaufmann Publishers, Elsevier Science Inc., New York, NY, USA, Aug. 5, 2002, 5 pages.
Luebke, et al., Chapter 6 Gaming Optimizations, Section 6.7 "Selection and Metrics," pp. 180-182, Level of Detail for 3D Graphics, Book, Morgan Kaufmann Publishers, Elsevier Science Inc., New York, NY, USA, Aug. 5, 2002, 3 pages.
Luebke, et al., Chapter 8 Perceptual Issues, Section 8.1 "Motivation" and Section 8.2 "Some Perceptually Motivated LOD Criteria," pp. 232-239, Level of Detail for 3D Graphics, Book, Morgan Kaufmann Publishers, Elsevier Science Inc., New York, NY, USA, Aug. 5, 2002, 8 pages.
Luebke, et al., Chapter 8 Perceptual Issues, Section 8.3 "Introduction to Vision," pp. 239-248, Level of Detail for 3D Graphics, Book, Morgan Kaufmann Publishers, Elsevier Science Inc., New York, NY, USA, Aug. 5, 2002, 10 pages.
Luebke, et al., Chapter 8 Perceptual Issues, Section 8.7 "Example Implementations," pp. 272-277, Level of Detail for 3D Graphics, Book, Morgan Kaufmann Publishers, Elsevier Science Inc., New York, NY, USA, Aug. 5, 2002, 6 pages.
Response to Office Action filed Oct. 8, 2014 in Chinese Patent Application No. 201110328586.0, with English Summary of the Arguments and English Translation of the Amended Claims, 19 pages.
Rolland et al., "Optical Versus Video See-Through Head-Mounted Displays in Medical Visualization," Presence: Teleoperators and Virtual Environments, vol. 9, Issue 3, Jun. 2000, pp. 287-309, MIT Press, Cambridge, MA, USA, 23 pages.
Office Action dated Oct. 31, 2013 in U.S. Appl. No. 12/905,952, 6 pages.
Response to Office Action filed Nov. 22, 2013 in U.S. Appl. No. 12/905,952, 7 pages.
Office Action dated Jan. 6, 2014 in U.S. Appl. No. 12/905,952, 41 pages.
Response to Office Action filed Apr. 7, 2014 in U.S. Appl. No. 12/905,952, 8 pages.
Office Action dated Nov. 27, 2013 in Chinese Patent Application No. 201110328586.0, with English Summary, 7 pages.
Office Action dated Jun. 3, 2014 in U.S. Appl. No. 12/912,937, 31 pages.
Office Action dated Mar. 13, 2014 in Chinese Patent Application No. 201110354995.8, with English Notification Sheet, 12 pages.
English Abstract of CN1627237, publication date Jun. 15, 2005, 1 page.
English Abstract of CN101510189, publication date Aug. 19, 2009, 1 page.
English Abstract of CN1452071, publication date Oct. 29, 2003, 1 page.
English Abstract of CN101673161, publication date Mar. 17, 2010, 1 page.
Notice of Allowance dated Jul. 11, 2014 in U.S. Appl. No. 12/905,952, 13 pages.
Response to Office Action filed Sep. 3, 2014 in U.S. Appl. No. 12/912,937, 12 pages.
International Search Report and Written Opinion dated Jun. 26, 2013 in PCT Application No. PCT/US2013/036023, 9 pages.
English Abstract of KR101032813 dated May 4, 2011, 1 page.
Agarwal, et al., "Occlusion Culling for Fast Walkthrough in Urban Areas", Sep. 19, 2000, 2 pages.
Billinghurst, Mark, and Hirokazu Kato, "Collaborative Mixed Reality," Proceedings of the First International Symposium on Mixed Reality held on Mar. 9-11, 1999 in Yokohama, Japan, Mixed Reality—Merging Real and Virtual Worlds, Jun. 1999, pp. 261-284, Springer Verlag, Berlin, Germany, 16 pages.
Breen et al., "Interactive Occlusion and Collision of Real and Virtual Objects in Augmented Reality", Technical Report ECRC-95-02, 1995, European Computer-Industry Research Center GmbH, Munich, Germany, 22 pages.
Clayton, Steve, "HoloDesk-Direct 3D Interactions with a Situated See-Through Display", Microsoft Research, Oct. 19, 2011 [retrieved on Oct. 26, 2011], Retrieved from the Internet: <URL:http://blogs.technet.com/b/next/archive/2011/10/19/microsoft-research-shows-some-fresh-thinking-on-nui-and-touch-interface.aspx>, 173 pages.

(56) References Cited

OTHER PUBLICATIONS

Elmqvist, et al., "Employing Dynamic Transparency for 3D Occlusion Management: Design Issues and Evaluation", In Proceedings of Interact 11th IFIP TC 13 International Conference on Human-computer Interaction, Sep. 10-14, 2007, 14 pages.
Encarnacao, et al., "Walk-up VR: Virtual Reality beyond Projection Screens," Institute of Electrical and Electronics Engineers Computer Graphics and Applications, Nov. 2000, pp. 19-23, vol. 20, Issue 5, IEEE Computer Society Press, Los Alamitos, CA, USA, 5 pages.
Giesen, Fabian, "Efficient Compression and Rendering in a Client-Server setting," Thesis submitted to the Math and Science faculty of Rheinischen Friedrich-Wilhelms-Universitat in Bonn, Germany, May, 2008, pp. 1-68, 68 pages.
Hughes, et al., "The Shared Imagination: Creative Collaboration in Augmented Virtuality", In Proceedings of Human Computer Interaction International, Jul. 22-27, 2005, 10 pages.
Kamat, et al., "Resolving Incorrect Visual Occlusion in Outdoor Augmented Reality Using TOF Camera and OpenGL Frame Buffer", In Proceedings of NSF Engineering Research and Innovation Conference, Jan. 4-7, 2011, 8 pages.
Koller et al, "Protected Interactive 3D Graphics Via Remote Rendering," International Conference on Computer Graphics and Interactive Techniques, Aug. 8-12, 2004, pp. 1-9, ACM, New York, NY, 9 pages.
Lok, et al., "Incorporating Dynamic Real Objects into Immersive Virtual Environments," Proceedings of the 2003 symposium on Interactive 3D graphics, Apr. 27-30, 2003, pp. 1-11, Association for Computing Machinery, Monterey, California, USA, 11 pages.
Olaiz, et al., "3D-Audio with CLAM and Blender's Game Engine", LinuxAudio.org, [retrieved Jan. 26, 2012], Retrieved from the Internet: <URL:http://lac.linuxaudio.org/2009/cdm/Thursday/05_Arumi/27.pdf>, 9 pages.
Pasman, et al., "Comparing Simplification and Image-Based Techniques for 3D Client-Server Rendering Systems," Institute of Electrical and Electronics Engineers—Transactions on Visualization and Computer Graphics, Apr. 2003, pp. 226-240, vol. 9, Issue 2, IEEE Educational Activities Department, Piscataway, NJ, 47 pages.
Quax, et al, "On the Applicability of Remote Rendering of Networked Virtual Environments on Mobile Devices," Proceedings of the 2006 International Conference on Systems and Networks Communication, Oct. 29-Nov. 3, 2006, pp. 1-6, IEEE, Washington, DC, 6 pages.
Ryu, et al., "Real-Time Occlusion Culling for Augmented Reality," Proceedings of Joint Workshop on Frontiers of Computer Vision (FCV'10), pp. 498-503, Hiroshima, Japan, Feb. 4-6, 2010, Retrieved from the Internet: <URL: https://sites.google.com/site/ryuseun/research-paper>, 6 pages.
Smit, et al, "An Image-Warping Architecture for VR: Low Latency versus Image Quality," The 2009 Institute of Electrical and Electronics Engineers Virtual Reality Conference, Mar. 14-18, 2009, pp. 27-34, IEEE, New York, NY, 8 pages.
"Sound Blaster Tactic3D Sigma", Creative.com [online], [retrieved on Jan. 30, 2012] Retrieved from the Internet: <URL:http://www.creative.com/soundblaster/tactic3d/sigma/>, 3 pages.
Stackoverflow, "3D Audio Engine", stackoverflow.com [online], Q & A for professional and enthusiast programmers, Mar. 2009 [retrieved on Jan. 26, 2012] Retrieved from the Internet: <URL:http://stackoverflow.com/questions/700947/3d-audio-engine>, 4 pages.
"THX TruStudio Software Suite", THX.com [online ], [retrieved on Jan. 30, 2012 ] Retrieved from the Internet: <URL:http://www.thx.com/consumer/thx-technology/thx-truststudio-software-suite/>, 6 pages.
Preliminary Amendment dated Aug. 26, 2011, U.S. Appl. No. 12/912,937, filed Oct. 27, 2010, 3 pages.
U.S. Appl. No. 12/905,952, filed Oct. 15, 2010.
U.S. Appl. No. 12/912,937, filed Oct. 27, 2010.
Response to Office Action in Chinese Patent Application No. 201110354995.8, with English Summary of the Response and English translation of the pending claims, 7 pages.
Response to Office Action date Jan. 23, 2015 in Chinese Patent Application No. 201110354995.8, with English translation of the claims and summary of Office Action, 8 pages.
Final Office Action dated Dec. 17, 2014 in U.S. Appl. No. 12/912,937, 31 pages.
Notice of Allowance received dated Nov. 2, 2014 in Chinese Patent Application No. 201110328586.0, with English translation of the notice and English Translation of the Allowed Claims, 7 pages.
Office Action received dated Nov. 15, 2014 in Chinese Patent Application No. 201110354995.8, with English translation of the Office Action, 9 pages.
Response to Office Action filed Mar. 30, 2015 in U.S. Appl. No. 12/912,937, 9 pages.
Office Action dated Apr. 10, 2015 in U.S. Appl. No. 12/912,937, 29 pages.

* cited by examiner

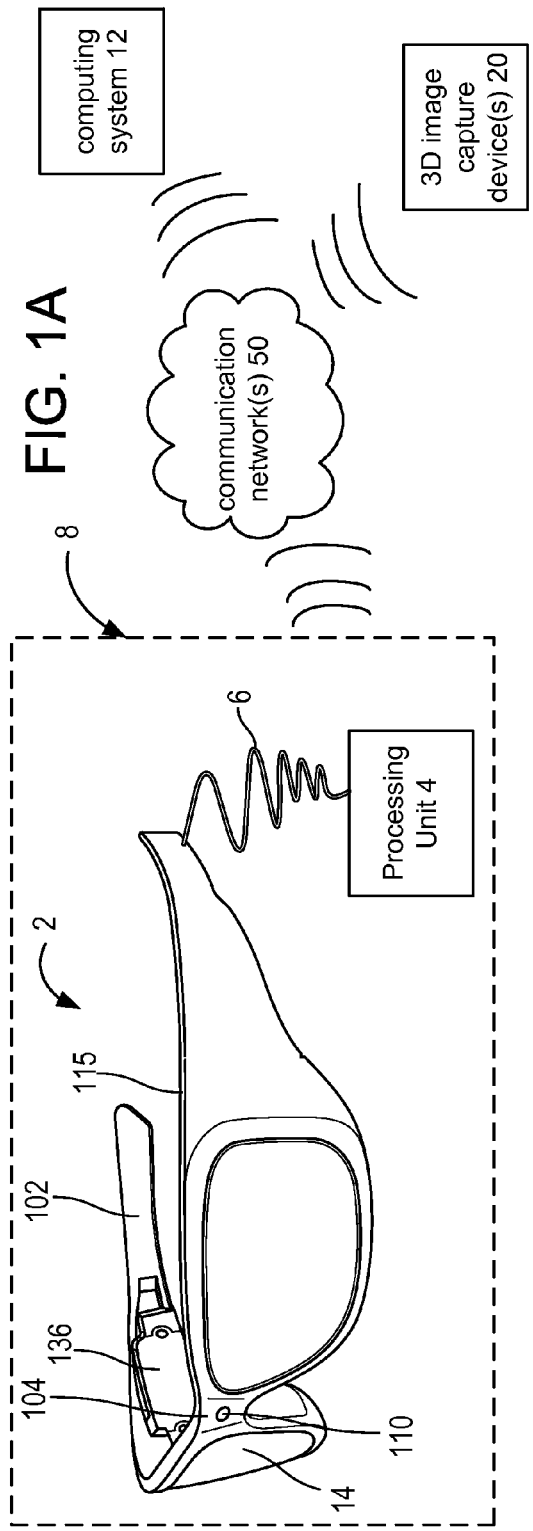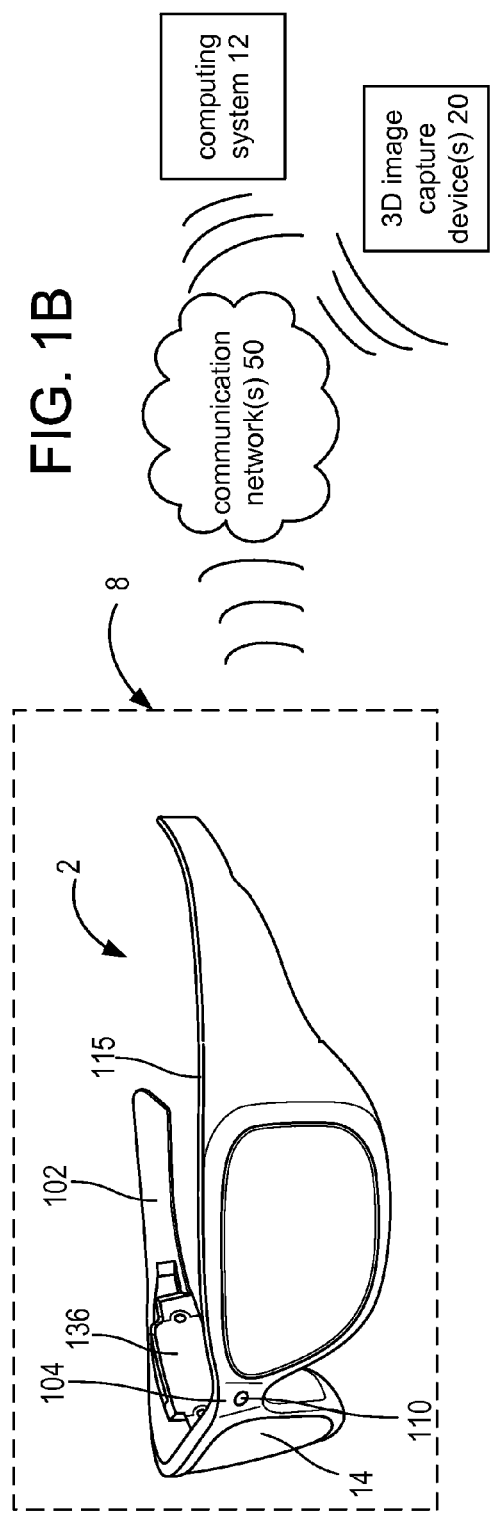

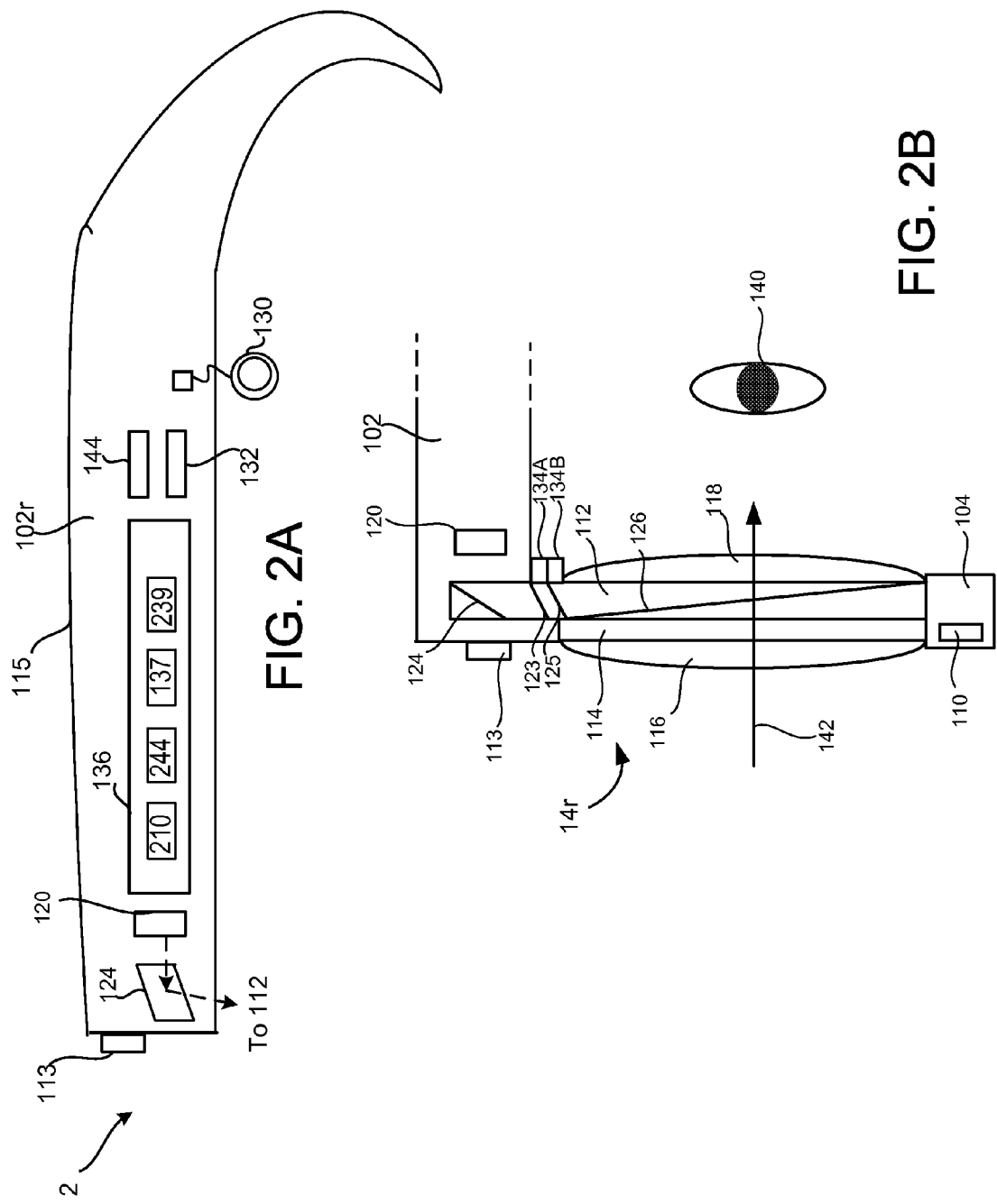

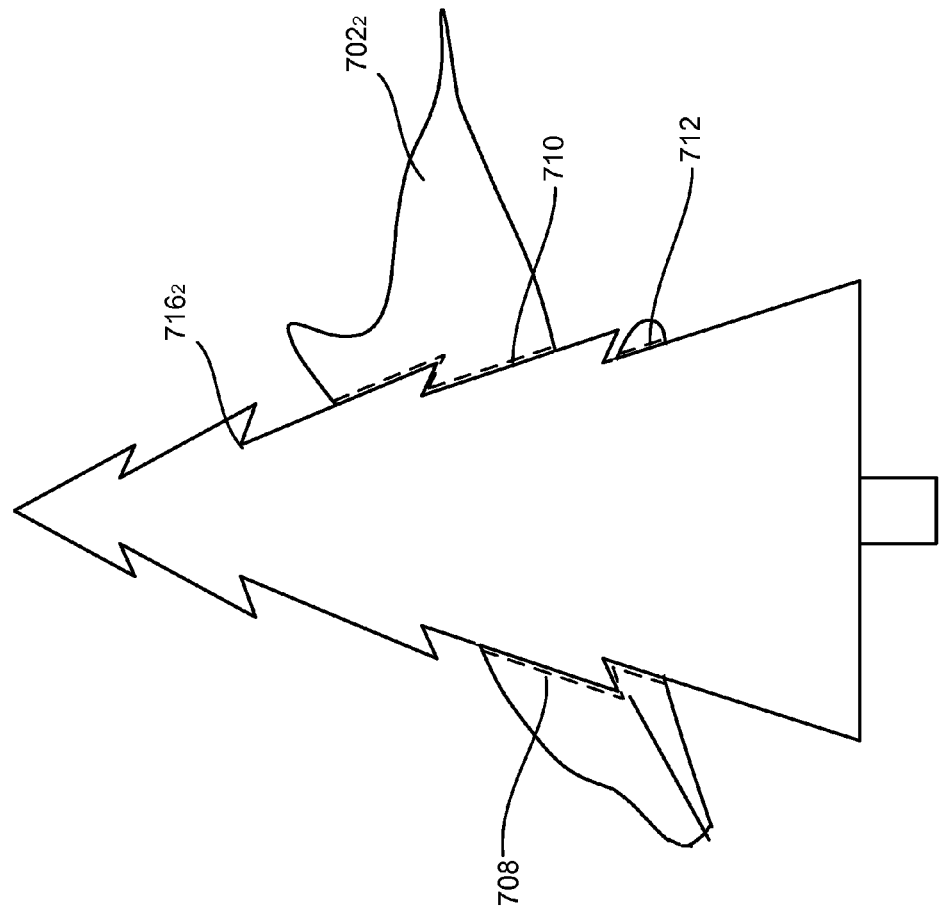
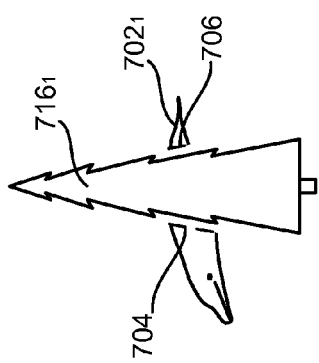
FIG. 7A
FIG. 7B

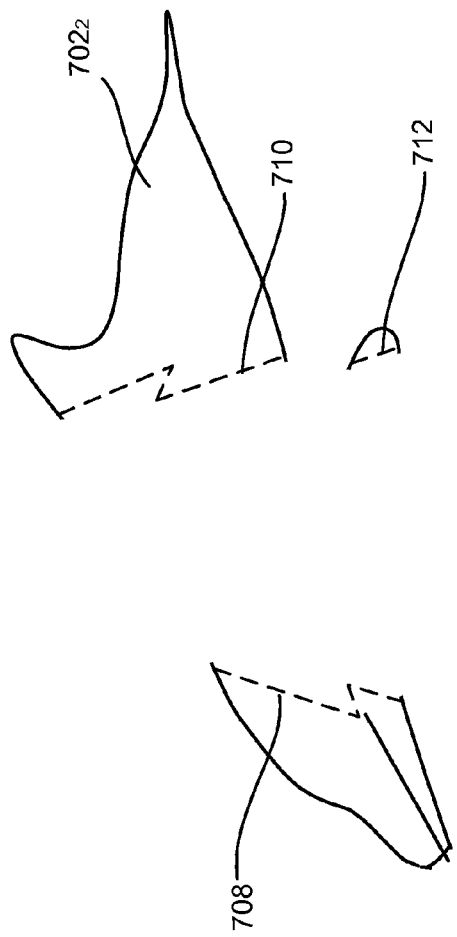
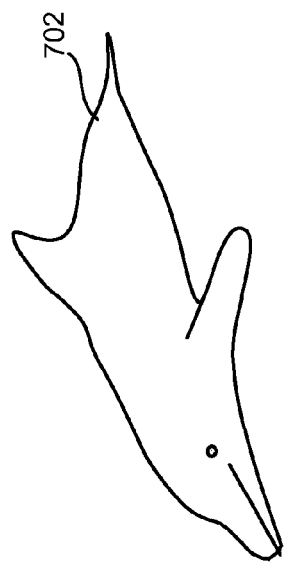
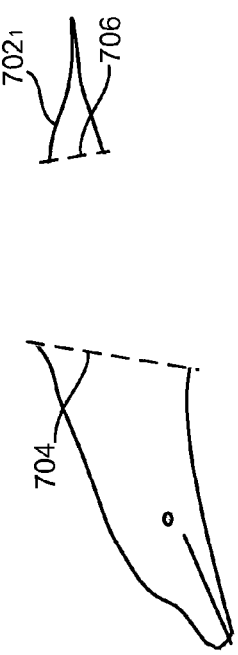
FIG. 8B
FIG. 8C
FIG. 8A

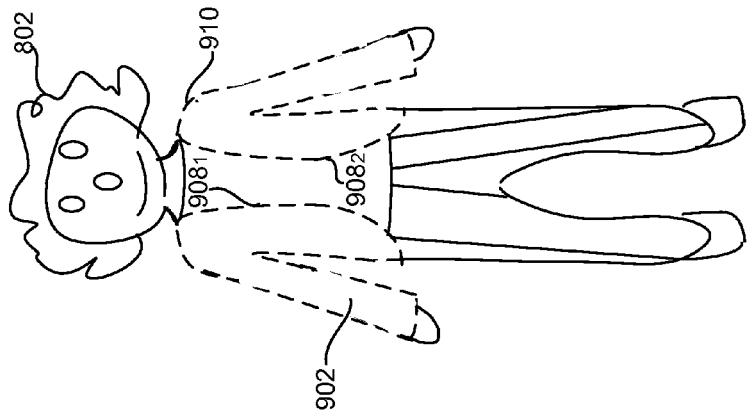
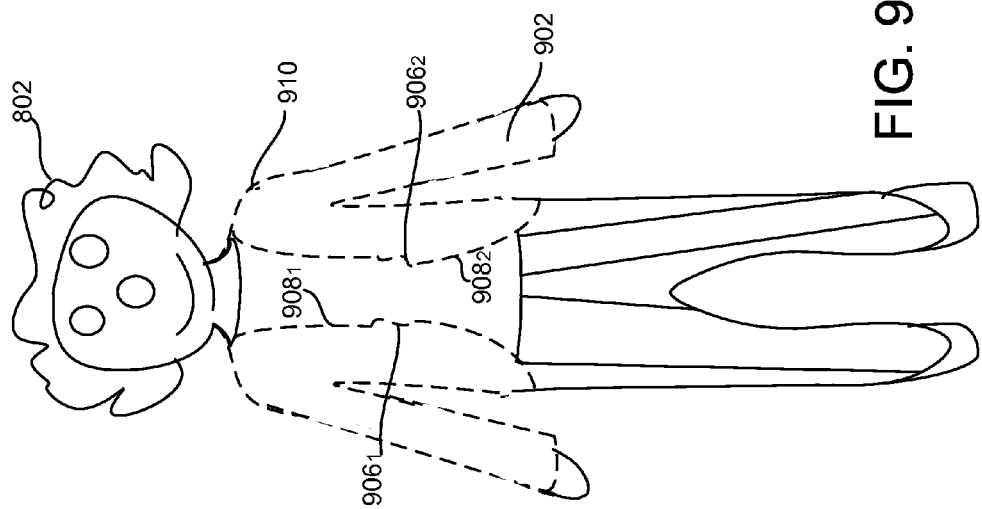
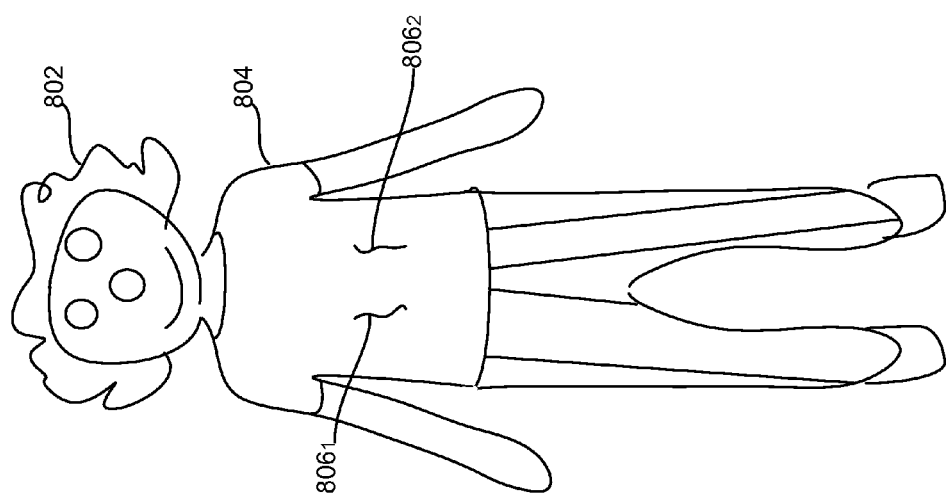
FIG. 9C
FIG. 9B
FIG. 9A

REALISTIC OCCLUSION FOR A HEAD MOUNTED AUGMENTED REALITY DISPLAY

CROSS REFERENCE TO RELATED PATENT APPLICATIONS

This application claims priority as a continuation-in-part to U.S. patent application Ser. No. 12/905,952 entitled "Fusing Virtual Content into Real Content," having inventors Jason Flaks, Avi Bar-Zeev, Jeffrey Neil Margolis, Chris Miles, Alex Aben-Athar Kipman, Andrew John Fuller, and Bob Crocco Jr., filed Oct. 15, 2010, published as US 2012/0092328 on Apr. 19, 2012 and issued as U.S. Pat. No. 8,884,984 on Nov. 11, 2014, which is hereby incorporated by reference.

BACKGROUND

Augmented reality, also referred to as mixed reality, is a technology that allows virtual imagery to be mixed with a user's view of the real world. In addition to making the physical properties (e.g. shape, color, size, texture) of virtual objects realistic in a display, it is desired that their position and movement with respect to real objects display realistically. For example, it is desired that a virtual object be blocked from view and block another object, real or virtual, from view like a real object would in a user field of view provided by the head mounted display device.

SUMMARY

The technology described herein provides realistic occlusion by a head mounted, augmented reality display device system. Particularly for virtual and real objects, a spatial occlusion relationship identifies at least one or more portions of an object being blocked from view in the user field of view, either partially or wholly. Either of the real object or the virtual object can be either an occluding object or an occluded object. The occluding object blocks the occluded object from view, at least partially. In the case of partial occlusion, there is at least one partial occlusion interface between the occluding object and the occluded object. A partial occlusion interface is the intersection at which a boundary for an occluding portion, of an occluding object is adjacent an unoccluded, e.g. unblocked, portion of the occluded object in the spatial relationship. For example, dashed lines 708, 710 and 712 in FIG. 7B are each an example of a partial occlusion interface between the virtual dolphin 7022 and the real tree 7162.

Besides a partial occlusion interface, a model in accordance with a level of detail may also be generated for a conforming occlusion interface in which at least a portion of boundary data of a virtual object conforms to at least a portion of boundary data for a real object. A conforming occlusion can be a whole occlusion or a partial occlusion.

In the interest of balancing realistic display of occlusion with updating the overall action in the field of view of the display device, a level of detail for a model, for example a geometrical model, representing an occlusion interface is determined based on one or more criteria such as a depth distance from the display device, display size, and closeness to a point of gaze. Some embodiments also comprise realistic, three dimensional audio occlusion of an occluded object, real or virtual, based on physical properties of the occluding object.

The technology provides one or more embodiments of a method for displaying realistic occlusion between a real object and a virtual object by a head mounted, augmented reality display device system. A spatial occlusion relationship between an occluding object and an occluded object including the real object and the virtual object is determined to exist based on overlapping three dimensional (3D) space positions of the objects in a 3D mapping of at least a user field of view of the display device system. Responsive to identifying the spatial occlusion relationship as a partial spatial occlusion between the real object and the virtual object, object boundary data of an occluding portion of the occluding object in the partial occlusion is retrieved. A level of detail is determined for a model representing a partial occlusion interface based on level of detail criteria. The display device system, alone or with the aid of other computers, generates a model of the partial occlusion interface based on the retrieved object boundary data in accordance with the determined level of detail. A modified version of boundary data of the virtual object adjacent an unoccluded portion of the real object is generated based on the model and the generated adjacent boundary data has a shape based on the model. The display device displays an unoccluded portion of the virtual object in accordance with the modified version of its boundary data.

The technology provides one or more embodiments of a see-through, augmented reality display device system for providing realistic occlusion. A see-through, augmented reality display device system comprises a see-through, augmented reality display having a user field of view and being supported by a support structure of the see-through, augmented reality display device. At least one camera for capturing image data and depth data for real objects in the user field of view is also supported by the support structure. One or more software controlled processors are communicatively coupled to the at least one camera for receiving image and depth data including the user field of view. The one or more software controlled processors determine a spatial occlusion relationship between an occluding object and an occluded object based on the image and depth data. The occluding object and the occluded object include a virtual object and a real object. The one or more software controlled processors are communicatively coupled to the see-through, augmented reality display and the one or more processors cause the see-through display to represent the spatial occlusion relationship in the display by modifying display of the virtual object. In some embodiments, the one or more processors cause the see-through display to represent the spatial occlusion relationship in the display by determining a level of detail for generating a model of an occlusion interface between the real object and the virtual object based on level of detail criteria. A modified version of object boundary data may be generated for the virtual object based on the generated model, and the see-through, augmented reality display can display the virtual object based on the modified version of its object boundary data.

The technology provides one or more embodiments of one or more processor readable storage devices having instructions encoded thereon which instructions cause one or more processors to execute a method for providing realistic audiovisual occlusion between a real object and a virtual object by a head mounted, augmented reality display device system. The method comprises determining a spatial occlusion relationship between a virtual object and a real object in an environment of a head mounted, augmented reality display device based on a three dimensional mapping of the environment. Whether an audio occlusion relationship exists between the virtual object and the real object is determined, and if so, audio data for the occluded object is modified based on one or more physical properties associated with an occluding object. One or more earphones of the display device are caused to output the modified audio data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a see-through, augmented reality display device system.

FIG. 1B is a block diagram depicting example components of another embodiment of a see-through, augmented reality display device system.

FIG. 2A is a side view of an eyeglass temple of a frame in an embodiment of the see-through, augmented reality display device embodied as eyeglasses providing support for hardware and software components.

FIG. 2B is a top view of an embodiment of a display optical system of a see-through, near-eye, augmented reality display device.

FIG. 7A illustrates an example of a level of detail using at least part of a boundary of a pre-defined bounding geometrical shape.

FIG. 7B illustrates an example of a level of detail using geometry fitting with a first accuracy criteria.

FIG. 8A illustrates an example of partial occlusion interfaces modeled as triangle legs for the virtual object in FIG. 7A.

FIG. 8B illustrates an example of partial occlusion interfaces modeled by geometry fitting with the first accuracy criteria for the virtual object in FIG. 7B.

FIG. 8C is a reference image of the unmodified virtual object, a dolphin, in FIGS. 7A, 7B, 7C and 8A and 8B.

FIG. 9A illustrates an example of a real person to which a conforming virtual object is registered.

FIG. 9B illustrates examples of conforming occlusion interfaces modeled at a first level of detail with a first accuracy criteria for a virtual object.

FIG. 9C illustrates an example of a conforming occlusion interface modeled with a second level of detail with a second accuracy criteria for a virtual object.

DETAILED DESCRIPTION

Figure 2C:
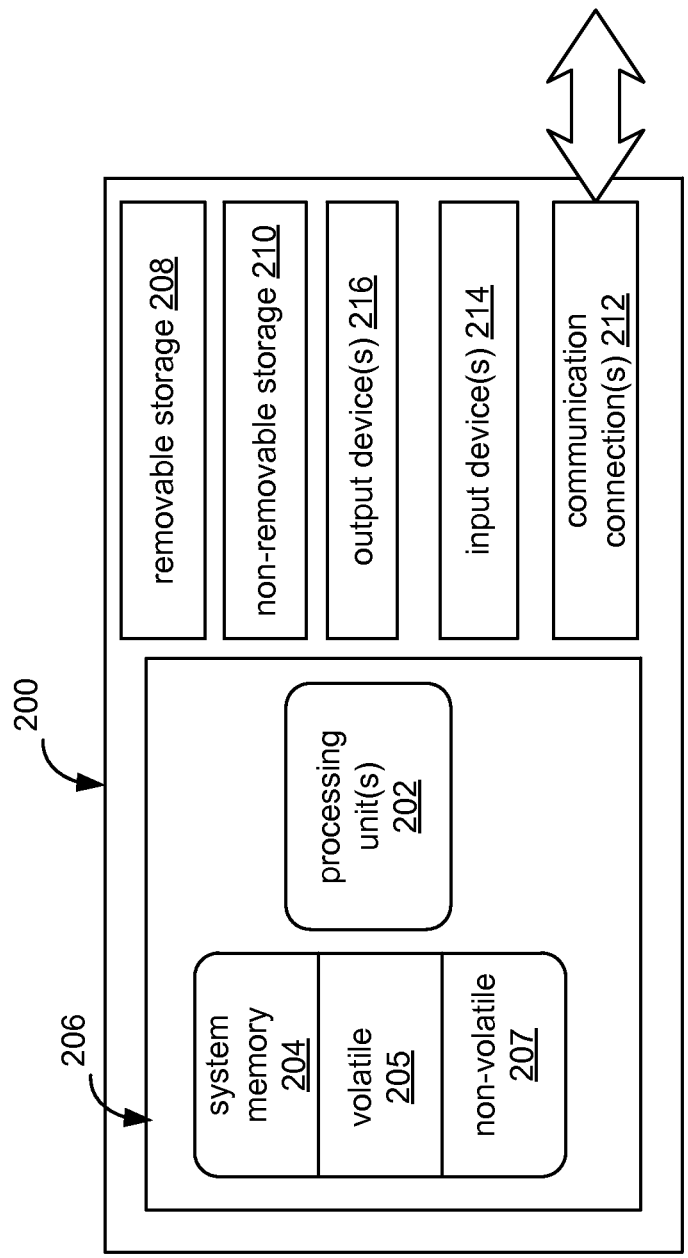
FIG. 2C is a block diagram of one embodiment of a computing system that can be used to implement a network accessible computing system.

Various embodiments are described for providing realistic occlusion between a real object and a virtual object by a see-through, augmented reality display device system. One or more cameras capture image data, of a field of view of the display of a display device system, hereafter referred to as a user field of view as it approximates a user's field of view when looking through the display device. A spatial occlusion relationship between a real object and a virtual object in the user field of view is identified based on the captured image data. A 3D model including 3D object space positions of at least the user field of view may be mapped based on stereopsis processing of the image data or based on depth data from one or more depth sensors and the image data. A 3D space is a volume of space occupied by the object.

Depending on precision captured, the 3D space can match the 3D shape of the object or be a less precise volume like a bounding shape around an object. Some examples of a bounding shape are a bounding box, a bounding sphere, a bounding cylinder, a bounding ellipse or a complex polygon which is typically a little larger than the object. The bounding volume may have a shape of a predefined geometry as in the examples. In other examples, the bounding volume shape is not a predetermined shape. For example, the volume may follow the detected edges of the object. The bounding volume may be used as an occlusion volume in some embodiments as discussed further below. A 3D space position represents position coordinates for the boundary of the volume or 3D space. In other words, the 3D space position identifies how much space an object occupies and where in the user field of view that occupied space is.

In a spatial occlusion relationship, one object blocks, either partially or wholly, another object in the field of view. In the illustrative examples of FIGS. 7A, 7B and 7C, a real pine tree partially occludes a virtual dolphin. In the case of a virtual object being completely blocked or occluded by a real object, not rendering the virtual object can represent its occlusion on the display. Similarly, a real object can be wholly or partially blocked by a virtual object according to an executing application. The virtual object can be displayed for the display elements, e.g. pixels of the display, for the whole or parts of the virtual object which are in front of the whole or parts of the real object. In other examples, the virtual object can be sized to completely cover the real object.

However, in some instances, the virtual object is to be displayed to conform its shape over at least a portion of a real object. There is a conforming occlusion interface as the shape of the occluding virtual object is dependent upon the shape of the portion of the real object which it has occluded, meaning blocked from view. A conforming occlusion interface is also modeled as discussed below to form a basis for generation of a modified version of the virtual object boundary data upon which display of the virtual object is based. In the case of partial occlusion, there is a partial occlusion interface which is the intersection at which an object boundary of an occluding portion of an occluding object meets or is adjacent to an unoccluded portion of an occluded object. For a partial occlusion or a whole occlusion between a real object and a virtual object, either type of object can be either the occluding object or the occluded object.

With a see-through display, whether the virtual object is the occluded object or the occluding object in the occlusion, image data of the unoccluded portion of the virtual object is modified to represent the occlusion as the real object is actually seen through the display. Displayed image data may be moving image data like video as well as still image data. With a video-see display, image data of the real world and the virtual images are displayed to a user so the user is not actually looking at the real world. The same embodiments for methods and processes discussed below may also be applied for a video-see display, if desired. Additionally, Z buffering of image data of real objects and virtual image data based on a Z depth test can be performed. In the case of a video-see display, image data of an occluded portion of an object, be it real or virtual, is not displayed, and the image data of the occluding object, be it real or virtual is displayed.

How realistic a virtual object looks is related to how many display primitives (e.g. triangles, lines, polygons, etc.) are used to represent it. The more display primitives and more complex the primitives, the more computation time a graphics pipeline takes to render them. Based on real time factors for an occlusion interface like a depth position, display size and closeness to what the user is looking at, an appropriate level of detail may be determined for representing or modeling the occlusion interface to improve computational efficiency while providing a realistic display of the occlusion interface. Some embodiments including audio occlusion of either a virtual or a real object based on a spatial occlusion detected in the environment of the user are also disclosed.

FIG. 1A is a block diagram depicting example components of an embodiment of a see-through, augmented or mixed reality display device system. System 8 includes a see-through display device as a near-eye, head mounted display device 2 in communication with a processing unit 4 via a wire 6 in this example or wirelessly in other examples. In this embodiment, head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world. Each display optical system 14 is also referred to as a see-through display, and the two display optical systems 14 together may also be referred to as a see-through display.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Frame 115 provides a support structure for holding elements of the system in place as well as a conduit for electrical connections. In this embodiment, frame 115 provides a convenient eyeglass frame as support for the elements of the system discussed further below. Some other examples of a near-eye support structure are a visor frame or a goggles support. The frame 115 includes a nose bridge portion 104 with a microphone 110 for recording sounds and transmitting audio data to control circuitry 136. A temple or side arm 102 of the frame rests on each of a user's ears, and in this example the temple 102 is illustrated as including control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing cameras 113 for recording digital images and videos and transmitting the visual recordings to the control circuitry 136 which may in turn send the captured image data to the processing unit 4 which may also send the data to one or more computer systems 12 over a network 50.

The processing unit 4 may take various embodiments. In some embodiments, processing unit 4 is a separate unit which may be worn on the user's body, e.g. a wrist, or be a separate device like a mobile device (e.g. smartphone). The processing unit 4 may communicate wired or wirelessly (e.g., WiFi, Bluetooth, infrared, RFID transmission, wireless Universal Serial Bus (WUSB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2 as in FIG. 1B. An example of hardware components of the processing unit 4 is shown in FIG. 2C.

One or more remote, network accessible computer system(s) 12 may be leveraged for processing power and remote data access. An example of hardware components of a computing system 12 is shown in FIG. 2C. An application may be executing on computing system 12 which interacts with or performs processing for an application executing on one or more processors in the see-through, augmented reality display system 8. For example, a 3D mapping application may be executing on the one or more computers systems 12 and the user's display device system 8. In some embodiments, the application instances may perform in a master and client role in which a client copy is executing on the display device system 8 and performs 3D mapping of its user field of view, receives updates of the 3D mapping from the computer system(s) 12 in a view independent format, receives updates of objects in its view from the master 3D mapping application and sends image data, and depth and object identification data, if available, back to the master copy. Additionally, in some embodiments, the 3D mapping application executing on different display device systems 8 in the same environment share data updates in real time, for example object identifications and occlusion data like an occlusion volume for a real object either in a peer-to-peer configuration between devices or to a 3D mapping application executing in one or more network accessible computing systems.

The shared data in some examples may be referenced with respect to a common coordinate system for the environment. In other examples, one head mounted display (HMD) device may receive data from another HMD device including image data or data derived from image data, position data for the sending HMD, e.g. GPS or IR data giving a relative position, and orientation data. An example of data shared between the HMDs is depth map data including image data and depth data captured by its front facing cameras 113 and occlusion volumes for real objects in the depth map. The real objects may still be unidentified or have been recognized by software executing on the HMD device or a supporting computer system, e.g. 12 or another display device system 8. In a case of not using a common coordinate system, the second HMD can map the position of the objects in the received depth map for its user perspective based on the position and orientation data of the sending HMD. Any common objects identified in both the depth map data of a field of view of the recipient HMD device and the depth map data of a field of view of the sending HMD device may also be used for mapping.

An example of an environment is a 360 degree visible portion of a real location in which the user is situated. A user may only be looking at a subset of his environment which is his field of view. For example, a room is an environment. A person may be in a house and be in the kitchen looking at the top shelf of the refrigerator. The top shelf of the refrigerator is within his field of view, the kitchen is his environment, but his upstairs bedroom is not part of his current environment as walls and a ceiling block his view of the upstairs bedroom. Of course, as he moves, his environment changes. Some other examples of an environment may be a ball field, a street location, a section of a store, a customer section of a coffee shop and the like. A location can include multiple environments, for example, the house may be a location. The user and his friends may be wearing their display device systems for playing a game which takes place throughout the house. As each player moves about the house, his environment changes. Similarly, a perimeter around several blocks may be a location and different intersections provide different environments to view as different cross streets come into view.

In the illustrated embodiments of FIGS. 1A and 1B, the computer system(s) 12 and the display device system 8 also have network access to 3D image capture devices 20. Capture devices 20 may be, for example, cameras that visually monitor one or more users and the surrounding space such that gestures and/or movements performed by the one or more users, as well as the structure of the surrounding space including surfaces and objects, may be captured, analyzed, and tracked. Such information may be used for example, to update display positions of virtual objects, displaying location based information to a user, and for identifying gestures to indicate one or more controls or actions for an executing application (e.g. game application).

Capture devices 20 may be depth cameras. According to an example embodiment, each capture device 20 may be configured with RGB and IR components to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight. The depth image may include a two-dimensional (2-D) pixel area of the captured field of view where each pixel in the 2-D pixel area may represent a length in, for example, centimeters, millimeters, or the like of an object in the captured field of view from the camera.

FIG. 1B is a block diagram depicting example components of another embodiment of a see-through, augmented or mixed reality display device system 8 which may communicate over a communication network 50 with other devices. In this embodiment, the control circuitry 136 of the display device 2 incorporates the functionality which a processing unit provides in FIG. 1A and communicates wirelessly via a wireless transceiver (see 137 in FIG. 2A) over a communication network 50 to one or more computer systems 12.

FIG. 2A is a side view of an eyeglass temple 102 of the frame 115 in an embodiment of the see-through, augmented reality display device 2 embodied as eyeglasses providing support for hardware and software components. At the front of frame 115 is physical environment facing video camera 113 that can capture video and still images, typically in color, of the real world to map real objects in the field of view of the see-through display, and hence, in the field of view of the user. In some examples, the cameras 113 may also be depth sensitive cameras which transmit and detect infrared light from which depth data may be determined. In other examples, a separate depth sensor (not shown) on the front of the frame 115 may also provide depth data to objects and other surfaces in the field of view. The depth data and image data form a depth map of the captured field of view of the cameras 113 which are calibrated to include the user field of view. A three dimensional (3D) mapping of the user field of view can be generated based on the depth map. Some examples of depth sensing technologies that may be included on the head mounted display device 2 without limitation, are SONAR, LIDAR, Structured Light, and/or Time of Flight.

In some embodiments, stereopsis is used for determining depth information instead of or in addition to a depth sensor. The outward facing cameras 113 provide overlapping image data from which depth information for objects in the image data may be determined based on stereopsis. Parallax and contrasting features such as color contrast may be used to resolve a relative position of one real object from another in the captured image data, for example for objects beyond a depth resolution of a depth sensor.

The cameras 113 are also referred to as outward facing cameras meaning facing outward from the user's head. The illustrated camera 113 is a front facing camera which is calibrated with respect to a reference point of its respective display optical system 14. One example of such a reference point is an optical axis (see 142 in FIG. 2B) of its respective display optical system 14. The calibration allows the field of view of the display optical systems 14, also referred to as the user field of view, to be determined from the data captured by the cameras 113.

Control circuits 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU), particularly in embodiments without a separate processing unit 4.

Inside, or mounted to temple 102, are an ear phone 130 of a set of ear phones 130, inertial sensors 132, one or more location or proximity sensors 144, some examples of which are a GPS transceiver, an infrared (IR) transceiver, or a radio frequency transceiver for processing RFID data. In one embodiment, inertial sensors 132 include a three axis magnetometer, three axis gyro and three axis accelerometer. The inertial sensors are for sensing position, orientation, and sudden accelerations of head mounted display device 2. From these movements, head position, and thus orientation of the display device, may also be determined. In this embodiment, each of the devices processing an analog signal in its operation include control circuitry which interfaces digitally with the digital processing unit 210 and memory 244 and which produces or converts analog signals, or both produces and converts analog signals, for its respective device. Some examples of devices which process analog signals are the sensor devices 144, 132, and ear phones 130 as well as the microphone 110, cameras 113 and an IR illuminator 134A, and an IR detector or camera 134B discussed below.

Mounted to or inside temple 102 is an image source or image generation unit 120 which produces visible light representing images. The image generation unit 120 can display a virtual object to appear at a designated depth location in a field of view to provide a realistic, in-focus three dimensional display of a virtual object which interacts with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 8, 2010 and "Automatic Focus Improvement for Augmented Reality Displays," having U.S. patent application Ser. No. 12/949, 650 and inventors Avi Bar-Zeev and John Lewis, and which was filed Nov. 18, 2010. In these examples, a focal length for an image generated by the microdisplay is changed by adjusting a displacement between an image source such as a microdisplay and at least one optical element like a lens or by adjusting the optical power of an optical element which receives the light representing the image. The change in focal length results in a change in a region of the field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In one embodiment, the image generation unit 120 includes a microdisplay for projecting images of one or more virtual objects and coupling optics like a lens system for directing images from the microdisplay to a reflecting surface or element 124. The microdisplay may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the image generation unit 120 into a lightguide optical element 112, which directs the light representing the image into the user's eye.

FIG. 2B is a top view of an embodiment of one side of a see-through, near-eye, augmented reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, lightguide optical element 112 for projecting image data from the image generation unit 120 is behind and aligned with opacity filter 114, and optional see-through lens 118 is behind and aligned with lightguide optical element 112.

Light guide optical element 112 transmits light from image generation unit 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system 14r, thereby allowing the user to have an actual direct view of the space in front of head mounted, display device 2 in addition to receiving a virtual image from image generation unit 120. Thus, the walls of light guide optical element 112 are see-through. Light guide optical element 112 is a planar waveguide in this embodiment and includes a first reflecting surface 124 (e.g., a mirror or other surface) which reflects incident light from image generation unit 120 such that light is trapped inside a waveguide. A representative reflecting element 126 represents the one or more optical elements like mirrors, gratings, and other optical elements which direct visible light representing an image from the planar waveguide towards the user eye 140.

Infrared illumination and reflections, also traverse the planar waveguide 112 for an eye tracking system 134 for tracking the position of the user's eyes which may be used for applications such as gaze detection, blink command detection and gathering biometric information indicating a personal state of being for the user. The eye tracking system 134 comprises an eye tracking IR illumination source 134A (an infrared light emitting diode (LED) or a laser (e.g. VCSEL)) and an eye tracking IR sensor 134B (e.g. IR camera, arrangement of IR photodetectors, or an IR position sensitive detector (PSD) for tracking glint positions). In this embodiment, representative reflecting element 126 also implements bidirectional infrared (IR) filtering which directs IR illumination towards the eye 140, preferably centered about the optical axis 142 and receives IR reflections from the user eye 140. In some examples, reflecting element 126 may include a hot mirror or gratings for implementing the bidirectional IR filtering. A wavelength selective filter 123 passes through visible spectrum light from the reflecting surface 124 and directs the infrared wavelength illumination from the eye tracking illumination source 134A into the planar waveguide 112. Wavelength selective filter 125 passes the visible light and the infrared illumination in an optical path direction heading towards the nose bridge 104. Wavelength selective filter 125 directs infrared radiation from the waveguide including infrared reflections of the user eye 140, preferably including reflections captured about the optical axis 142, out of the waveguide 112 to the IR sensor 134B.

In other embodiments, the eye tracking unit optics are not integrated with the display optics. For more examples of eye tracking systems for HMD devices, see U.S. Pat. No. 7,401, 920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Opacity filter 114, which is aligned with light guide optical element 112, selectively blocks natural light from passing through light guide optical element 112 for enhancing contrast of virtual imagery. When the system renders a scene for the augmented reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

Again, FIGS. 2A and 2B only show half of the head mounted display device 2. A full head mounted display device would include another set of optional see-through lenses 116 and 118, another opacity filter 114, another light guide optical element 112, another image generation unit 120, physical environment facing camera 113 (also referred to as outward facing or front facing camera 113), eye tracking assembly 134, and earphone 130. Additional details of a head mounted display device system are illustrated in U.S. patent application Ser. No. 12/905,952 entitled "Fusing Virtual Content Into Real Content", Filed Oct. 15, 2010, fully incorporated herein by reference.

Figure 3A:
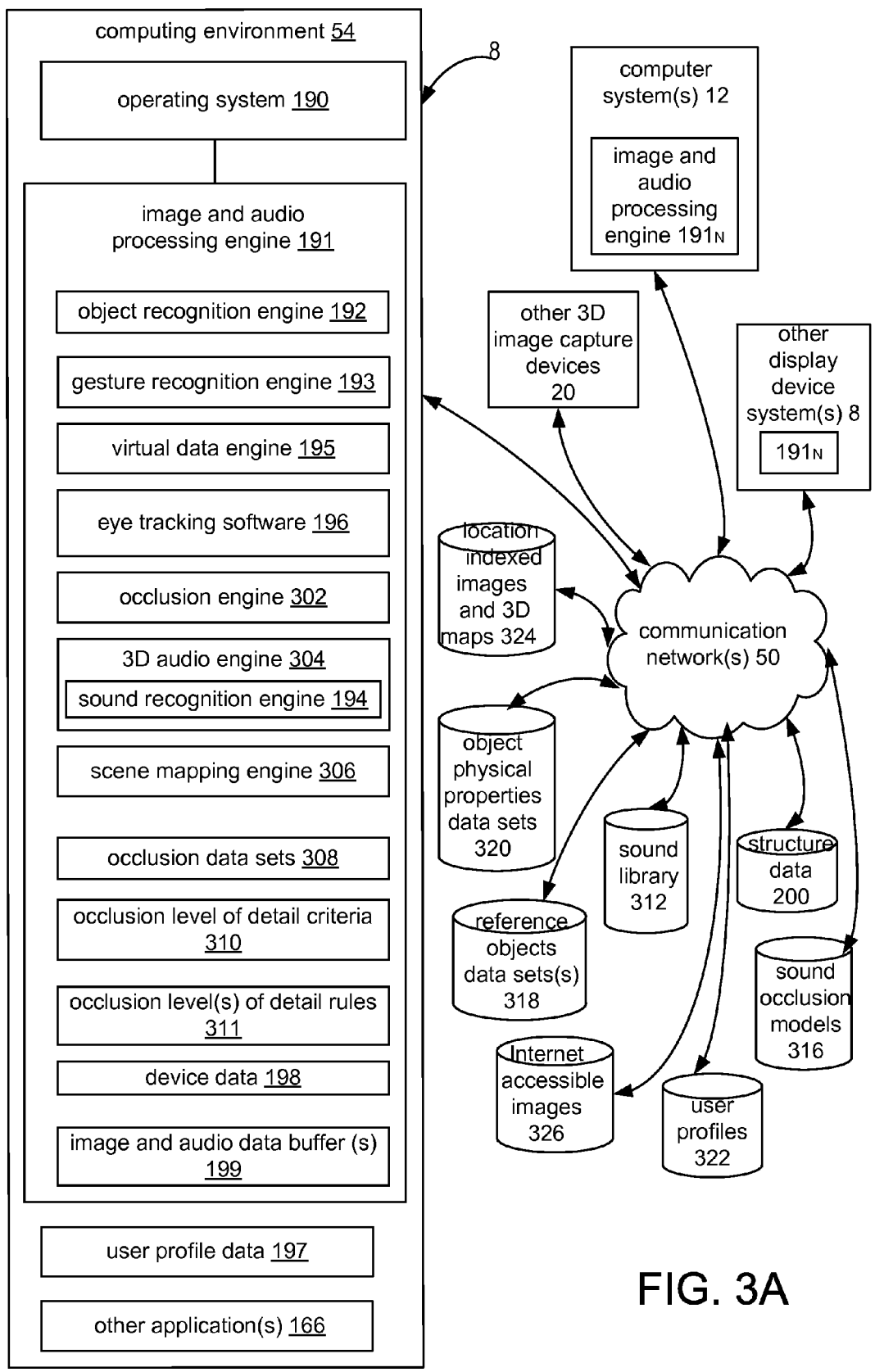
FIG. 3A is a block diagram of a system from a software perspective for providing realistic occlusion between a real object and a virtual object by a head mounted, augmented reality display device system.

FIG. 2C is a block diagram of one embodiment of a computing system that can be used to implement one or more network accessible computing systems 12 or a processing unit 4 which may host at least some of the software components of computing environment 54 or other elements depicted in FIG. 3A. With reference to FIG. 2C, an exemplary system includes a computing device, such as computing device 200. In its most basic configuration, computing device 200 typically includes one or more processing units 202 including one or more central processing units (CPU) and one or more graphics processing units (GPU). Computing device 200 also includes memory 204. Depending on the exact configuration and type of computing device, memory 204 may include volatile memory 205 (such as RAM), non-volatile memory 207 (such as ROM, flash memory, etc.) or some combination of the two. This most basic configuration is illustrated in FIG. 2C by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2C by removable storage 208 and non-removable storage 210.

Device 200 may also contain communications connection(s) 212 such as one or more network interfaces and transceivers that allow the device to communicate with other devices. Device 200 may also have input device(s) 214 such as keyboard, mouse, pen, voice input device, touch input device, etc. Output device(s) 216 such as a display, speakers, printer, etc. may also be included. All these devices are well known in the art and need not be discussed at length here.

FIG. 3A is a block diagram of a system from a software perspective for providing realistic occlusion between a real object and a virtual object by a head mounted, augmented reality display device system. FIG. 3A illustrates a computing environment embodiment 54 from a software perspective which may be implemented by a head mounted display device system like system 8, one or more remote computing systems 12 in communication with one or more display device systems or a combination of these. Additionally, display device systems can communicate with other display device systems for sharing data and processing resources. Network connectivity allows leveraging of available computing resources. As shown in the embodiment of FIG. 3A, the software components of a computing environment 54 comprise an image and audio processing engine 191 in communication with an operating system 190. Image and audio processing engine 191 processes image data (e.g. moving data like video or still), and audio data in order to support applications executing for an HMD device system like a see-through, augmented reality display device system 8. Image and audio processing engine 191 includes object recognition engine 192, gesture recognition engine 193, virtual data engine 195, eye tracking software 196 if eye tracking is in use, an occlusion engine 302, a 3D positional audio engine 304 with a sound recognition engine 194, and a scene mapping engine 306 all in communication with each other.

The computing environment 54 also stores data in image and audio data buffer(s) 199. The buffers provide memory for receiving image data captured from the outward facing cameras 113, image data captured by other capture devices if available, image data from an eye tracking camera of an eye tracking assembly 134 if used, buffers for holding image data of virtual objects to be displayed by the image generation units 120, and buffers for both input and output audio data like sounds captured from the user via microphone 110 and sound effects for an application from the 3D audio engine 304 to be output to the user via earphones 130.

A 3D mapping of the user field of view of the see-through display can be determined by the scene mapping engine 306 based on captured image data and depth data for the user field of view. A depth map can represent the captured image data and depth data. A view dependent coordinate system may be used for the mapping of the user field of view as whether an object occludes another object depends on the user's point of view. An example of a view dependent coordinate system is an x, y, z coordinate system in which the z-axis or depth axis extends orthogonally or as a normal from the front of the see-through display. In some examples, the image and depth data for the depth map representing the user field of view is received from the cameras 113 on the front of the display device 2.

Even before a real object is recognized or identified, occlusion processing may be performed. Before completing object identification, the object recognition engine 192 can detect boundaries of a real object in the depth map and may assign a bounding volume as a 3D space surrounding a real object. The bounding volume is identified to the 3D scene mapping engine 306 and the occlusion engine 302. For example, the object recognition engine 192 may identify the bounding volume in a message to the operating system 190 which broadcasts the message to other engines like the scene mapping and occlusion engine and applications which register for such data. The bounding volume may be used as an occlusion volume for occlusion processing even before object recognition is performed. For example, a fast moving object may be causing occlusions which are processed based on the occlusion volumes and the depth map data even though the object passes out of view before it is recognized. The boundary of the occlusion volume may be used, at least partially, as a basis for generating an occlusion interface. The scene mapping engine 306 may assign 3D space positions for one or more real objects detected in the user field of view based on the depth map. As objects are identified by the object recognition engine 192 as discussed below, the 3D spaces or volumes for the objects in the mapping may be refined to better match the actual shape of a real object. From the virtual data engine 195 or an executing application, a 3D space position of a virtual object is determined within the 3D mapping of the user field of view. The occlusion engine 302 may assign an occlusion volume to a virtual object as well based on level of detail criteria.

Mapping what is around the user in the user's environment can be aided with sensor data. Data from the orientation sensor 132, e.g. the three axis accelerometer 132C and the three axis magnetometer 132A, determines position changes of the user's head and correlation of those head position changes with changes in the image and depth data from the front facing cameras 113 can identify positions of objects relative to one another. As mentioned above, depth map data of another HMD device, currently or previously in the environment, along with position and head orientation data for this other HMD device can also be used to map what is in the user environment. Shared real objects in their depth maps can be used for image alignment and other techniques for image mapping. With the position and orientation data as well, what objects are coming into view can be predicted as well so occlusion and other processing can start even before the objects are in view.

The scene mapping engine 306 can also use a view independent coordinate system for 3D mapping. The map can be stored in the view independent coordinate system in a storage location (e.g. 324) accessible by other display device systems 8, other computer systems 12 or both, be retrieved from memory and be updated over time as one or more users enter or re-enter the environment. In some examples, image and object registration into a common coordinate system may be performed using an extrinsic calibration process. The registration and/or alignment of images (or objects within the images) onto a common coordinate system allows the scene mapping engine to be able to compare and integrate real-world objects, landmarks, or other features extracted from the different images into a unified 3-D map associated with the real-world environment.

When a user enters an environment, the scene mapping engine 306 may first search for a pre-generated 3D map identifying 3D space positions and identification data of objects stored locally or accessible from another display device system 8 or a network accessible computer system 12. The map may include stationary objects. The map may also include objects moving in real time and current light and shadow conditions if the map is presently being updated by another system. Additionally, the pre-generated map may include identification data for objects which tend to enter the environment at predicted times in order to speed recognition processing. A pre-generated map may also store occlusion data as discussed below. A pre-generated map may be stored in a network accessible database like image and map database(s) 324.

The environment may be identified by location data. Location data may be used as an index to search in location indexed image and pre-generated 3D map databases 324 or in Internet accessible images 326 for a map or image related data which may be used to generate a map. For example, GPS data from a GPS transceiver 144 of the location and proximity sensors on the display device 2 may identify the location of the user. Additionally, an IP address of a WiFi hotspot or cellular station to which the display device system 8 has a connection can identify a location. Cameras at known positions within a location may identify the user and other people through facial recognition. Additionally, maps and map updates, or at least object identification data may be exchanged between display device systems 8 in a location via infra-red, Bluetooth or WUSB as the range of the signal allows.

An example of image related data which may be used to generate a map is metadata associated with any matched image data from which objects and their positions within a coordinate system for the location can be identified. For example, a relative position of one or more objects in image data from the outward facing cameras of the user's display device system 8 can be determined with respect to one or more GPS tracked objects in the location from which other relative positions of real and virtual objects can be identified.

As described in the discussion of FIGS. 1A and 1B, image data for mapping an environment can come from cameras other than those 113 on the user's display device 2. Image and depth data from multiple perspectives can be received in real time from other 3D image capture devices 20 under control of one or more network accessible computer systems 12 or from at least one other display device system 8 in the environment. Depth images from multiple perspectives may be combined based on a view independent coordinate system for describing an environment (e.g. an x, y, z representation of a room, a store space, or a geofenced area) for creating the volumetric or 3D mapping. For example, if the scene mapping engine 306 receives depth images from multiple cameras, the engine 306 correlates the images to have a common coordinate system by lining up the images and uses depth data to create the volumetric description of the environment.

In some examples, a 3D mapping, whether it be a depth map of a user field of view, a 3D mapping of an environment or a location in a view independent coordinate system, or somewhere in between, may be modeled as a 3D mesh of an environment. A mesh may comprise a detailed geometric representation of various features and surfaces within a particular environment or region of an environment. A 3D point cloud representing the surfaces of objects including things like walls and floors in a space can be generated based on captured image data and depth data of the user environment. A 3D mesh of the surfaces in the environment can then be generated from the point cloud. More information regarding the generation of 3-D maps can be found in U.S. patent application Ser. No. 13/017,690, "Three-Dimensional Environment Reconstruction," incorporated herein by reference in its entirety.

Besides sharing data for scene mapping, in some embodiments scene mapping may be a collaborative effort with other display device systems 8, or other network accessible image capture devices (e.g. 20) in a location providing image data and depth data, or a combination of these, and one or more network accessible computer system(s) 12 to help with the computations and share map updates. (For more information on collaborative scene mapping between HMDs like system 8 and hub computer systems 12 with access to image data, see "Low-Latency Fusing of Virtual and Real Content," having U.S. patent application Ser. No. 12/912,937 having inventors Avi Bar-Zeev et al. and filed Oct. 27, 2010 and which is hereby incorporated by reference.) In some instances, a scene mapping engine 306 on a network accessible computer system 12 receives image data of multiple user fields of view from multiple see-through augmented reality display device systems 8 in an environment and correlates their image data based on capture times for the data in order to track changes of objects and lighting and shadow in the environment in real time. 3D map updates can then be sent to the multiple display device systems 8 in the environment. The 3D mapping data can be saved in accordance with pre-generation criteria for future faster retrieval. Some examples of such pre-generation criteria includes stationary objects, time of day and ambient conditions which effect light and shadow. In other instances, a display device system 8 can broadcast its image data or 3D map updates to other display device systems 8 in an environment and likewise receive such updates from another device system. Each local scene mapping engine 306 then updates its 3D mapping in accordance with the broadcasts.

As described above, a scene mapping engine 306, particularly one executing on a display device system 8, can map a user field of view based on image data and depth data captured by cameras 113 on the device. The user field of view 3D mapping may also be determined remotely or using a combination of remote and local processing. A scene mapping engine 306, typically executing on one or more network accessible computer systems 12, can also generate a 3D mapping of the unique user field of view of a respective subset of the environment for each of multiple display device systems 8 based on combining depth and image data from the various depth images received from the display devices systems 8 and the 3D mapping of the environment being updated in the independent coordinate system.

The object recognition engine 192 of the image and audio processing engine 191 detects, tracks, and identifies objects in the user field of view and the 3D environment of the user based on the captured image data and depth data, if available, or determined depth positions from stereopsis. The object recognition engine 192 distinguishes real objects from each other by marking object boundaries and comparing the object boundaries with structural data. One example of marking object boundaries is detecting edges within detected or derived depth data and image data, connecting the edges and comparing with stored structure data in order to find matches within a probability criteria. A polygon mesh may also be used to represent the object's boundary as mentioned above. One or more databases of structure data 200 accessible over one or more communication networks 50 may include structural information about objects. As in other image processing applications, a person can be a type of object, so an example of structure data is a stored skeletal model of a human which may be referenced to help recognize body parts. Structure data 200 may include structural information regarding one or more inanimate objects in order to help recognize the one or more inanimate objects, some examples of which are furniture, sporting equipment, automobiles and the like.

The structure data 200 may store structural information as image data or use image data as references for pattern and facial recognition. The object recognition engine 192 may also perform facial and pattern recognition on image data of the objects based on stored image data from other sources as well like user profile data 197 of the user, other users profile data 322 accessible by a hub, location indexed images and 3D maps 324 and Internet accessible images 326. Motion capture data from image and depth data may also identify motion characteristics of an object.

The object recognition engine 192 may also check detected properties of an object against reference properties of an object like its size, shape and motion characteristics. An example of such a set of reference properties for an object is a reference object data set as stored in reference objects data sets(s) 318.

Figure 3B:
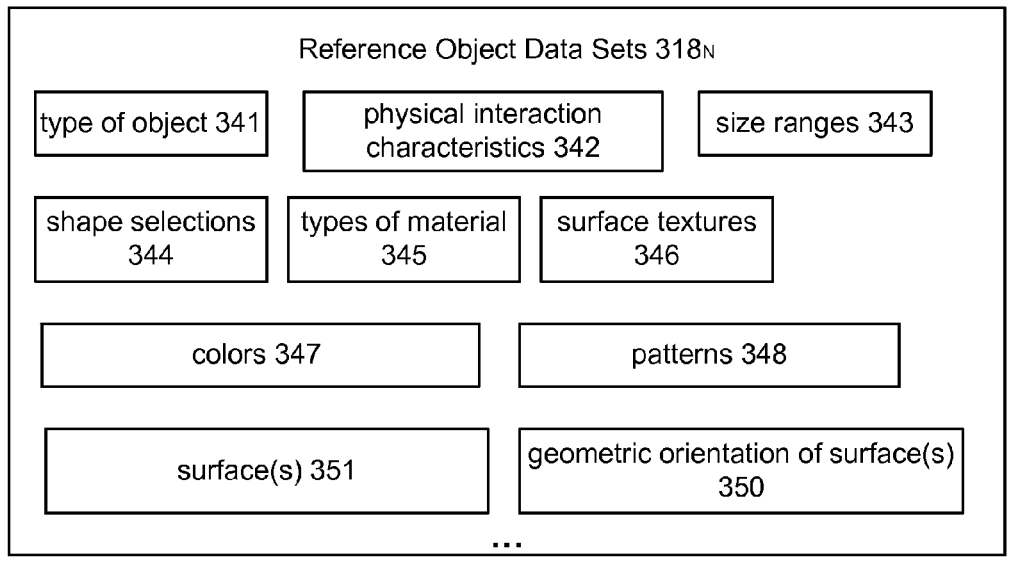
FIG. 3B illustrates an example of a reference object data set.

FIG. 3B illustrates an example of a reference object data set 318N with some examples of data fields. The reference data sets 318 available to the object recognition engine 192 may have been predetermined manually offline by an application developer or by pattern recognition software and stored. Additionally, if a user inventorizes an object by viewing it with the display device system 8 and inputting data for the data fields, a reference object data set is generated. Also, reference object data sets can be created and stored for sharing with other users as indicated in share permissions. The data fields include a type of object 341 which may be a data record which also includes sub-fields. For the type of object 341, the other data fields provide data records identifying the types of physical properties available for the type of object. For example, the other data records identify physical interaction characteristics 342, size ranges 343, shape selections available 344, typical types of material 345, colors available 347, patterns available 348, surface(s) available 351, typical surface texture(s) 346, a geometric orientation 350 of each available surface 351.

Figure 3C:
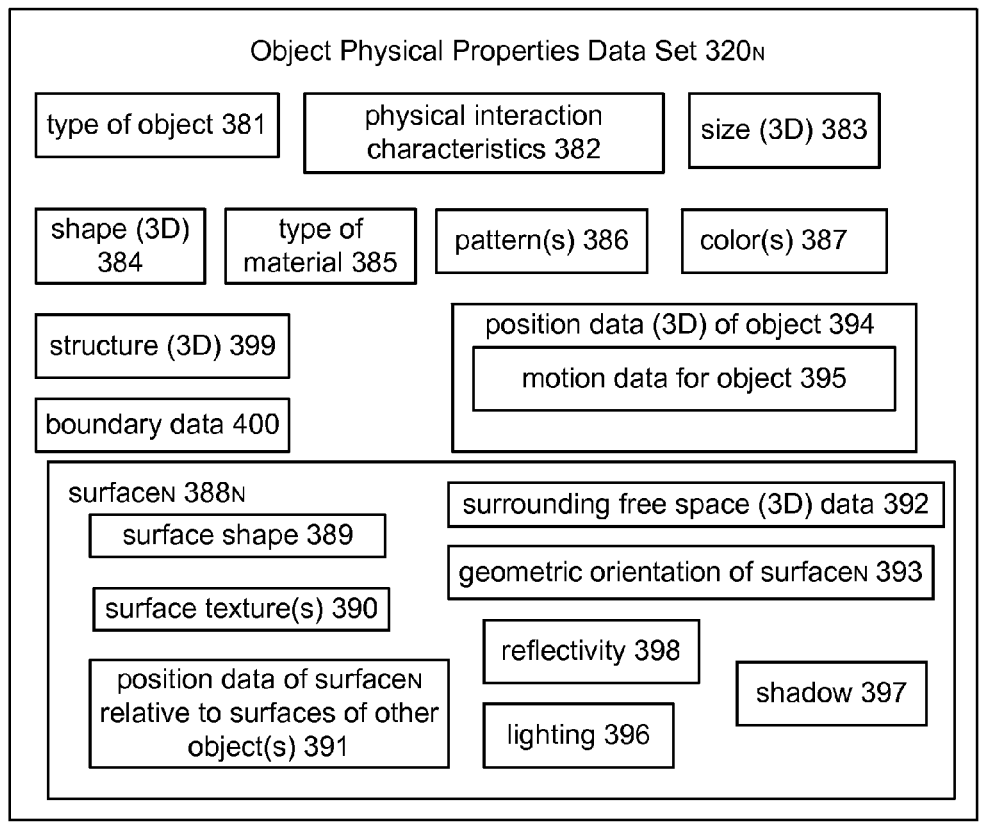
FIG. 3C illustrates some examples of data fields in an object physical properties data set.

FIG. 3C illustrates some examples of data fields in an object physical properties data set 320N stored for either a specific real object or a specific virtual object which includes data values detected or otherwise determined based on captured data of the real object, or data pre-defined or generated by an application for the specific virtual object. The example data fields include a type of object 381, physical interaction characteristics 382 which are determined based on other physical properties like size 383, in three dimensions in this example, shape 384, also 3D in this example, structure 399 (e.g. skeletal or for an inanimate object), also in three dimensions in this example, boundary data 400 and type of material 385. For example, as the real object is closer to the user in the field of view, more detected boundary data like data points and edges, representing the more details which are detectable now that the object is closer may be stored and also form a basis for motion data 395 for the object. Some other exemplary data fields include pattern(s) 386 and colors 387 as well as surface(s) 388N. Position data 394 in 3D for the object may also be stored. In this example, the position data 394 includes motion data 395 tracking a direction of movement through positions in a location.

Surface 388N represents an exemplary data set for each surface identified. The data set includes one or more surface textures 390, a geometric orientation 393 of the surfaceN, a surface shape 389 (e.g. flat, round, curvy, uneven, etc.), and other factors like surrounding free space (3D) data 392, and lighting 396, shadow 397, and reflectivity 398 of the respective surface determined from the image data. The surrounding free space (3D) 392 may be determined from position data 391 of the surfaceN relative to one or more surfaces of one or more other objects, real or virtual, in the real environment. These other objects would typically be nearest neighbor objects. Furthermore, the position of surfaces of the same object with respect to each other may be a basis for determining thickness and 3D shape overall. The surrounding free space and position data may be used to determine when an audio occlusion exists.

These different properties are weighted, and a probability is assigned whether an object in the image data is a certain type of object. The real object physical properties data set 335 may be stored in one or more network accessible data stores 320.

Upon detection of one or more objects by the object recognition engine 192, other engines of the image and audio processing engine 191 like the scene mapping engine 306 and the occlusion engine 302 receive an identification of each object detected and a corresponding position and/or orientation. This object data is also reported to the operating system 190 which passes the object data along to other executing applications like other upper level applications 166.

As mentioned above, whether an occlusion exists between objects depends on the viewer's point of view. What a viewer sees from his point of view is his field of view. A point of view is also called a perspective. In some embodiments, a perspective of a user wearing a display device, referred to hereafter as a user perspective and the user field of view from the user perspective, may be approximated by a view dependent coordinate system, having orthogonal X, Y and Z axes in which a Z-axis represents a depth position from the front of the display device system 8 or one or more points determined in relation to the front of the display device system like an approximate location for the user's foveae. For quick processing, the depth map coordinate system of the depth cameras 113 may be used to approximate a view dependent coordinates system of the user field of view in some examples. The occlusion engine 302 identifies occlusions between objects, and in particular between real and virtual objects, based on volumetric position data for recognized objects within the view dependent coordinate system of a 3D mapping of the user field of view as updated by the objection recognition engine 192 and the scene mapping engine 306.

A 3D space position of an object is volumetric position data in that it represents the volume occupied by the object and the position of that object volume in a coordinate system. The occlusion engine 302 compares the 3D space positions of objects in the user field of view from the user perspective for each upcoming display update. The occlusion engine 302 can process objects currently in the field of view and those predicted to enter the field of view as notified by the scene mapping engine 306. An occlusion may be identified by an overlap portion in the coordinates of 3D space positions. For example, the virtual object and the real object share area covering the same area in X and Y view dependent coordinates, but have different depths, for example one object is in front of another object. In one implementation example, the 3D object boundary data represented in the 3D space positions is projected as a mask of object boundary data onto a 2d viewing plane in an image buffer 199 for determining overlapping boundaries. Depth data associated with the boundary data is then used to identify which boundary belongs to the occluding object and which boundary data belongs to the occluded object.

As mentioned above, in the case of complete occlusion of a virtual object by a real object, the occlusion engine can notify the virtual data engine 195 (see below) to not display the virtual object. In the case of complete occlusion of the real object by the virtual object, the virtual object or its parts can be sized to completely cover the real object and its parts. However, in the case of a partial occlusion, the display is to be updated to show part of the virtual object in relation to the real object. In the case of a see-through display, the display is to be updated to show part of the virtual object while part of the real object is still seen through the display device 2. The occlusion engine 302 identifies and stores in an occlusion data set object boundary data of an occluding portion, also referred to as a blocking or an overlapping portion, of the occluding object as a basis upon which a partial occlusion interface is to be generated. There may be more than one partial occlusion interface between the same pair of virtual and real objects in a spatial occlusion. The processing may be performed separately for each partial occlusion interface. Additionally, a virtual object can conform its shape over at least a portion of a real object. The portions of the object boundary data of both the real and virtual object in the conforming portions can also be stored in an occlusion data set for use in representing or modeling the conforming interface.

Again, with a see-through display device, the user is actually seeing real objects present in the field of view. Regardless of whichever object is occluding, a modified version of the virtual object is generated to represent the occlusion. For either type of interface, a modified version of the boundary data of the virtual object is generated by the occlusion engine 302. The virtual data engine 195 displays the unoccluded portion of the virtual object in accordance with its modified boundary data. Using a partial occlusion interface as an illustrative example, the virtual object's boundary data, e.g. polygon mesh area or sequence of edges, is modified so that its unoccluded portion now has a boundary adjacent the unoccluded portion of the real object, and the shape of this new boundary data is like that of the model generated for the partial occlusion interface. As mentioned above, a video-see device may employ embodiments of the same methods and processes.

The occlusion engine 302 determines a level of detail for a model generated of the partial occlusion interface in order to display an unoccluded portion of the virtual object adjacent the partial occlusion interface. The more the model of the interface matches the detail of the boundary data of the overlapping portion, the more realistic the interface will look on the display. A level of detail can also be determined by the engine 302 for a conforming occlusion interface. The level of detail defines parameters and which techniques may be used effecting the resulting geometry of the model of either type of interface. Rule sets 311 for the different occlusion levels of detail control which geometrical modeling techniques may be used and accuracy criteria like how much of the object boundary data determined based on detection of the object or stored in a detailed version of the object is to be incorporated in the model unmodified and a smoothing tolerance. For example, for a same set of boundary data as a sequence of edges, one level of detail may result in a generated model of the sequence of edges as a curve which incorporates more of the unmodified object boundary data than another level of detail which results in a model of the same sequence of edges as a line. Another example of a level of detail is using bounding or occlusion volumes for object boundary data and tracking the occlusion volumes using depth map data for quicker occlusion processing rather than waiting for object recognition.

Level of detail criteria are factors which effect how much detail a user would perceive either due to approximations of human perceptual limitations or display resolution. Examples of level of detail criteria as may be represented in data stored in memory as occlusion level of detail criteria 310 include depth position, display size, speed of the interface in the user field of view and distance from a point of gaze and these criteria and determinations based on them are discussed in more detail with respect to FIGS. 6A to 6D.

Occlusion data sets 308 generated by the occlusion engine 302 or received from another system (8 or 12) are also stored in memory. In some embodiments, occlusion data is associated with a virtual object and a real object and includes one or more models generated at one or more levels of detail for at least one occlusion interface between the virtual and real objects. As mentioned above, the unmodified boundary data at issue for the occlusion interface may also be stored in the occlusion data set. Occlusion level of detail criteria 310 and occlusion level of detail rules 311 are also stored for use by the occlusion engine in determining how to model a partial occlusion interface or a conforming occlusion interface. Occlusion data may be shared like object identification data and position data with a pre-generated map or as data useful for generating a 3D map.

Occlusion data may be first generated for one mobile display device system. As subsequent display devices encounter the same occlusion, they can download generated occlusion interfaces for different levels of detail instead of regenerating them. For example, for a level of detail based on being within a depth distance range and a user perspective angular range to an object, the previously generated model of a partial occlusion interface may be re-used. Such saved occlusion data may be particularly useful for stationary real objects in an environment like a building. However, for moving real objects having a predictable speed range and path through a location, e.g. a bus on a schedule in a street scene, saved occlusion data may also save time. Whether an object is stationary or movable or a mobility rating may be determined based on the type of object 381 for the object.

Besides detecting spatial occlusions in a user field of view, other occlusions in the user's environment or location but not in his field of view can be identified by the occlusion engine 302 based on 3D space positions of the objects with respect to the user. An occlusion engine 302 executing in the display device system 8 or the hub 12 can identify the occlusions. Although not seen, such an occlusion with respect to the user may cause audio data associated with the occluded object to be modified based on the physical properties of the occluding object.

The 3D audio engine 304 is a positional 3D audio engine which receives input audio data and outputs audio data for the earphones 130. The received input audio data may be for a virtual object or be that generated by a real object. Audio data for virtual objects generated by an application can be output to the earphones to sound as if coming from the direction of the virtual object projected into the user field of view. An example of a positional 3D audio engine which may be used with an augmented reality system is disclosed in U.S. patent application Ser. No. 12/903,610 entitled "System and Method for High-Precision 3-Dimensional Audio for Augmented Reality," to Flaks et al., and filed Oct. 13, 2010, which is hereby incorporated by reference. The output audio data may come from sound library 312.

Sound recognition software 194 of the 3D audio engine identifies audio data from the real world received via microphone 110 for application control via voice commands and environment and object recognition. Besides recognizing content of the audio data like a voice command or a piece of music, the 3D audio engine 304 attempts to recognize which object made the audio data. Based on a sound library 312, the engine 304 can identify a sound with a physical object, e.g. a horn sound associated with a certain make or model of car. Additionally, voice data files stored in user profile data 197 or user profiles 322 may also identify a speaker with whom a person object mapped in the environment may be associated.

In addition to uploading their image data, display device systems 8 and 3D image capture devices 20 in a location upload their captured audio data to a hub computing system 12. Sometimes, this may be the user's voice but can also include sounds made in the environment of the user. Based on the sound quality and objects near a user as well as an identification of a type of object based on the sound library used by the sound recognition software component, which object in an environment or location which generated a sound can be made. Additionally, pre-generated 3D maps of a location can provide an audio index of sounds of objects fixed in the location or which enter and leave the location on a regular basis, e.g. train and bus sounds. Sharing of data about objects, both real and virtual, including sounds they make between multiple display device systems 8 and the hubs 12 facilitate identifying the object which made the sound. So sound object candidates identified based on matches in the sound library 312 or voice data files can be compared with objects identified in an environment and even a location for a match.

Once the real or virtual object associated with the input audio data is identified by occlusion engine 302 as being in a spatial occlusion and the spatial occlusion results in the object being audially occluded, the 3D audio engine 304 can access a sound occlusion model 316 for the audial occluded object which provides rules for modifying the audio data as output to the earphones 130 to represent the occlusion.

Figure 4A:
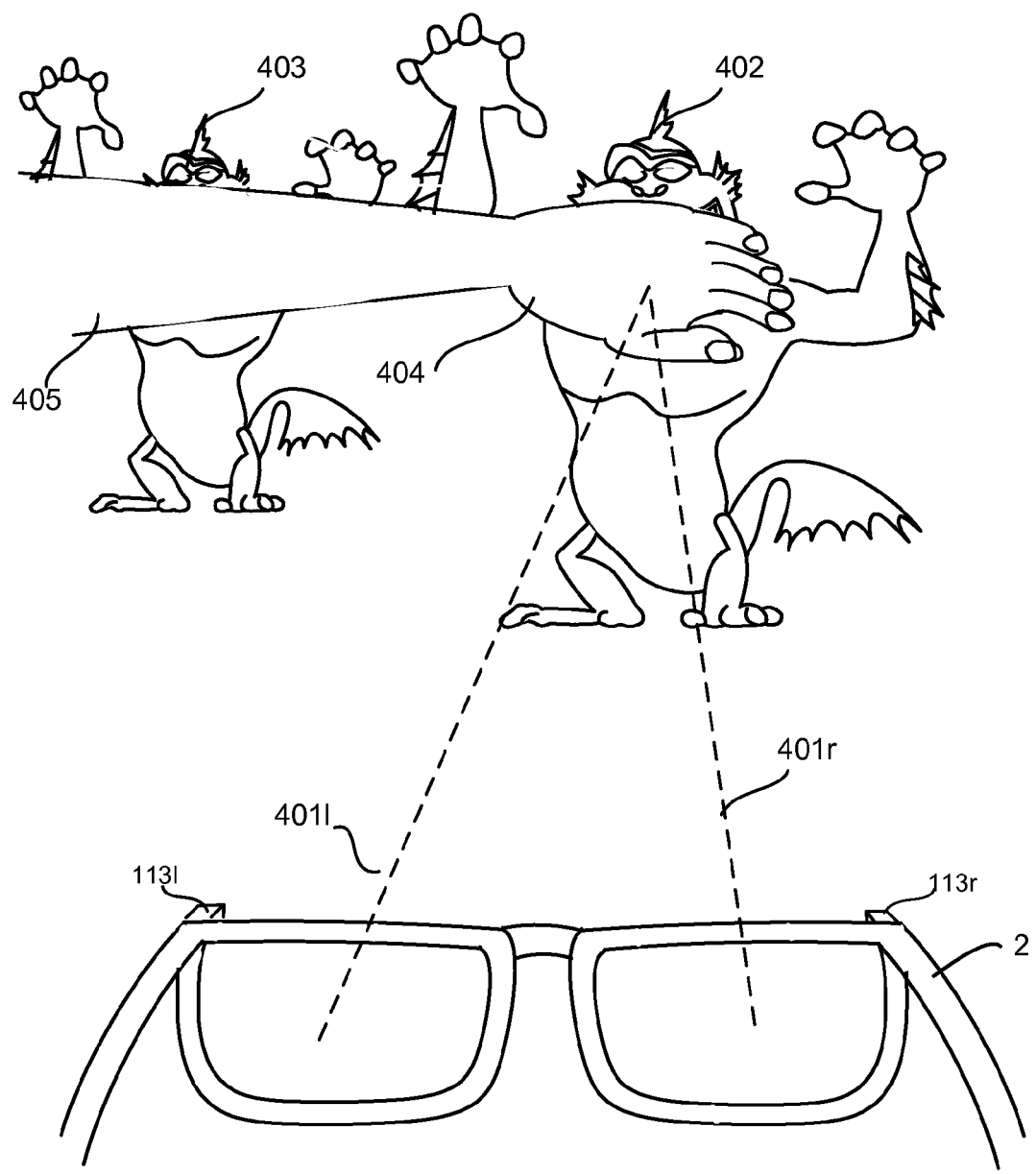
FIG. 4A illustrate an example of a spatial occlusion resulting in an audio occlusion of a virtual object by a real object.
Figure 4B:
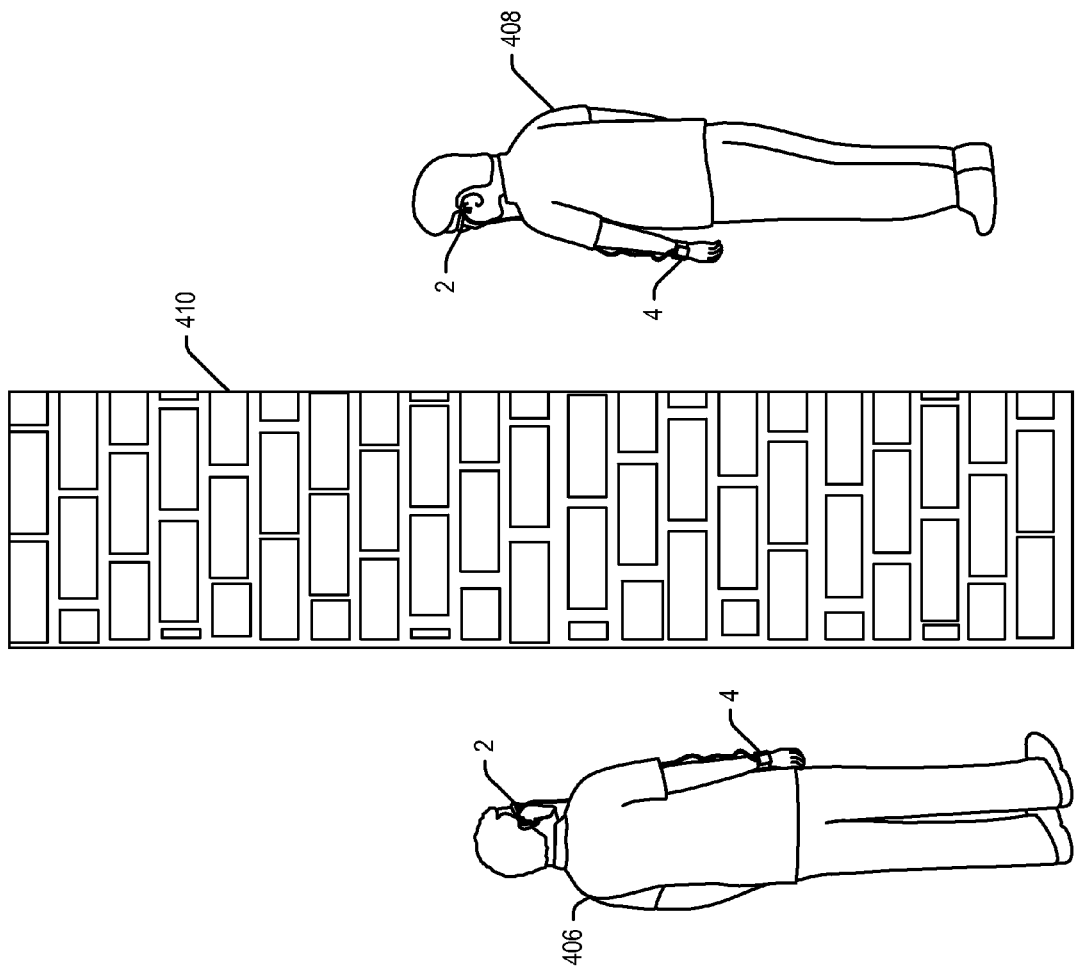
FIG. 4B illustrates an example of a spatial occlusion resulting in an audio occlusion of a real object by a virtual object.

The method figures below provide some examples of how to determine whether a spatial occlusion has caused an audial occlusion. For example, one criteria is whether a sound making part of an occluded object is blocked in the partial occlusion. FIGS. 4A and 4B provide examples of audio occlusion due to spatial occlusion.

FIG. 4A illustrate an example of a spatial occlusion resulting in an audio occlusion of a virtual object by a real object. FIG. 4A also illustrates occlusion of a sound making area. The user's hand 404, as seen in the user field of view as indicated by gaze lines 401*l* and 401*r*, is identified as being positioned over monster 402 in the field of view and having virtually the same depth distance as monster 402, so audio for monster 402 is muffled in accordance with the sound dampening characteristics of a human hand. In another example, a distance for a sound effect like muffling between the occluding object and the occluded object may indicate no significant audio occlusion exists or is a factor on weightings for things like volume, tone and pitch associated with audio data. Monster 403 is partially occluded in this field of view by the user's arm 405, but monster 403 is several feet back from the arm depth and monster 402 as well. The sound absorbing characteristics of a single human body part has a very small range, so no audial occlusion effect exists for an occluded object like monster 403 which is several feet away.

FIG. 4B illustrates an example of a spatial occlusion resulting in an audio occlusion of a real object by a virtual object. In this example, a virtual brick wall 410 appears to users Bob 406 and George 408 in their respective head mounted display devices 2 while executing a quest type of game which they are both playing, and which an action of George triggered to appear. In this example, to provide a realistic experience, neither George 408 nor Bob 406 should be able to hear each other due to the sound absorption characteristic of a thick brick wall (e.g. 18 inches) 410 between them if it were real. In FIG. 4B, audio data generated by George is blocked, e.g. his cries for help, or removed from audio received via Bob's microphone and sent to Bob's earphones. Likewise, George's 3D audio engine, modifies audio data received at George's earphones to remove audio data generated by Bob.

To hear the audio of the virtual objects generated by executing applications and sent to the 3D audio engine 304, the user typically uses the earphones for better hearing. In the case of real objects, the sounds of the real objects received at the microphone can be buffered before being output to the user's earphones so the user experiences the audio occlusion effects applied to the real object audio when the user is using the earphones.

The physical properties including type of material of an object are used to determine its one or more effects on audio data. A sound occlusion model 316 may include rules for representing the one or more effects which the 3D audio engine 304 can implement. For example, one type of material may be primarily a sound absorber in which the amplitude of the sound wave is dampened and the sound energy is turned to heat energy. Absorbers are good for sound proofing. A sound occlusion model may for example indicate a damping coefficient to the amplitude of the audio data to represent an aborption effect. Another type of material may act to reflect sound waves such that the angle of incidence is the angle of reflection for a pre-defined percentage of waves hitting the material. Echo and Doppler effects may be output by the 3D audio engine as a result. A third type of material acts as a sound diffuser reflecting incident sound waves in all directions. A sound occlusion model associated with the object having this type of material has rules for generating reflection signals of audio data in random directions off the size and shape of the occluding object which the 3D audio engine implements. Within these general categories of sound characteristics, there may be more specific cases like a resonant absorber which dampens the amplitude of a sound wave as it is reflected. 3D audio engines, such as may be used in interactive gaming with all artificial display environments, have techniques for modifying sound waves to create echos, Doppler effects as well as absorption, reflection and diffusion effects.

The outward facing cameras 113 in conjunction with the object recognition engine 192 and gesture recognition engine 193 implements a natural user interface (NUI) in embodiments of the display device system 8. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user indicating a control or command to an executing application. The action may be performed by a body part of a user, e.g. a hand or finger, but also an eye blink sequence of an eye can be a gesture. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Virtual data engine 195 processes virtual objects and registers the 3D space position and orientation of virtual objects in relation to one or more coordinate systems, for example in user field of view dependent coordinates or in the view independent 3D map coordinates. The virtual data engine 195 determines the position of image data of a virtual object or imagery (e.g. shadow) in display coordinates for each display optical system 14. Additionally, the virtual data engine 195 performs translation, rotation, and scaling operations for display of the virtual object at the correct size and perspective. A virtual object position may be dependent upon, a position of a corresponding object which may be real or virtual. The virtual data engine 195 can update the scene mapping engine about the 3D space positions of the virtual objects processed.

Device data 198 may include a unique identifier for the computer system 8, a network address, e.g. an IP address, model number, configuration parameters such as devices installed, identification of the operating system, and what applications are available in the display device system 8 and are executing in the display system 8 etc. Particularly for the see-through, augmented reality display device system 8, the device data may also include data from sensors or determined from the sensors like the orientation sensors 132, the temperature sensor 138, the microphone 110, and the one or more location and proximity transceivers 144.

For illustrative purposes, the method embodiments below are described in the context of the system embodiments described above. However, the method embodiments are not limited to operating in the system embodiments described above and may be implemented in other system embodiments. Furthermore, the method embodiments are continuously performed, and there may be multiple occlusions between real and virtual objects being processed for a current user field of view. For example, as the user wearing the head mounted, augmented reality display device system moves at least her head, and real and virtual objects move as well, the user's field of view continues to change as do observable occlusions. A display typically has a display or frame rate which updates faster than the human eye can perceive, for example 30 frames a second.

Figure 5A:
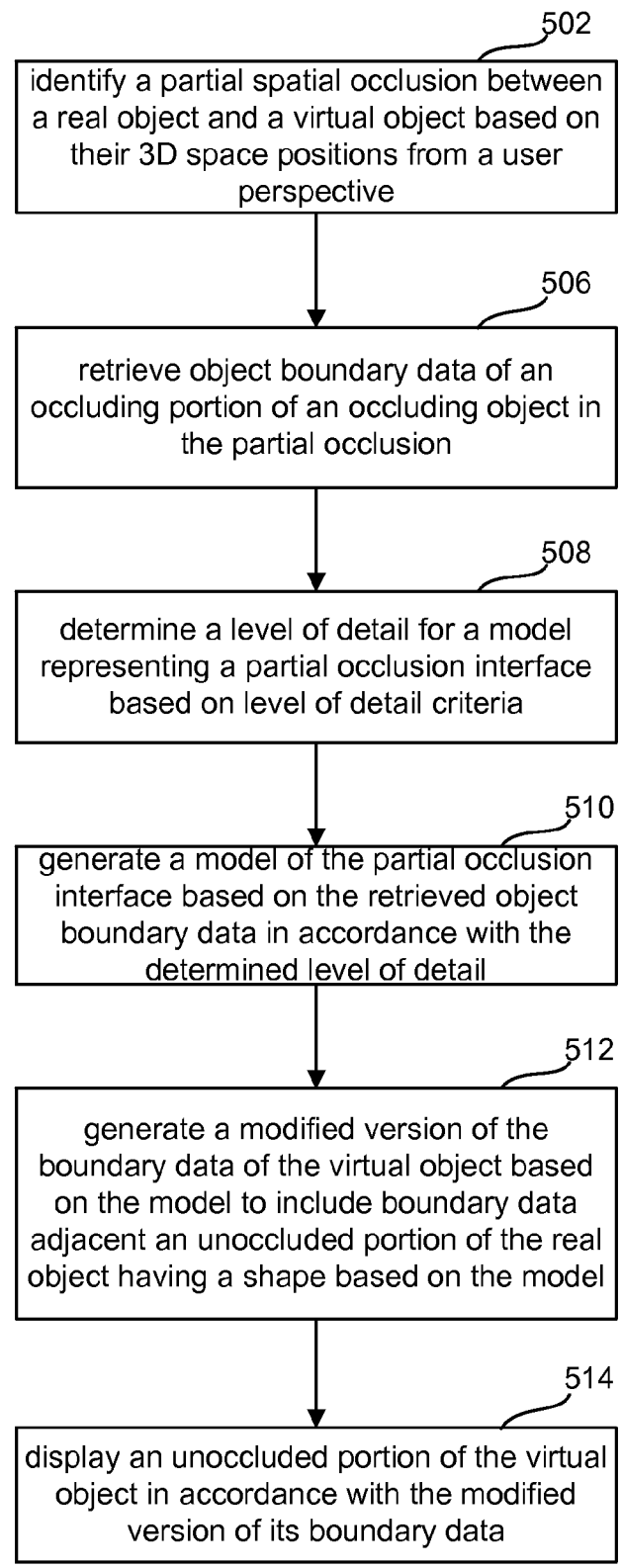
FIG. 5A is a flowchart of an embodiment of a method for displaying realistic partial occlusion between a real object and a virtual object by a head mounted augmented reality display device system.
Figure 5B:
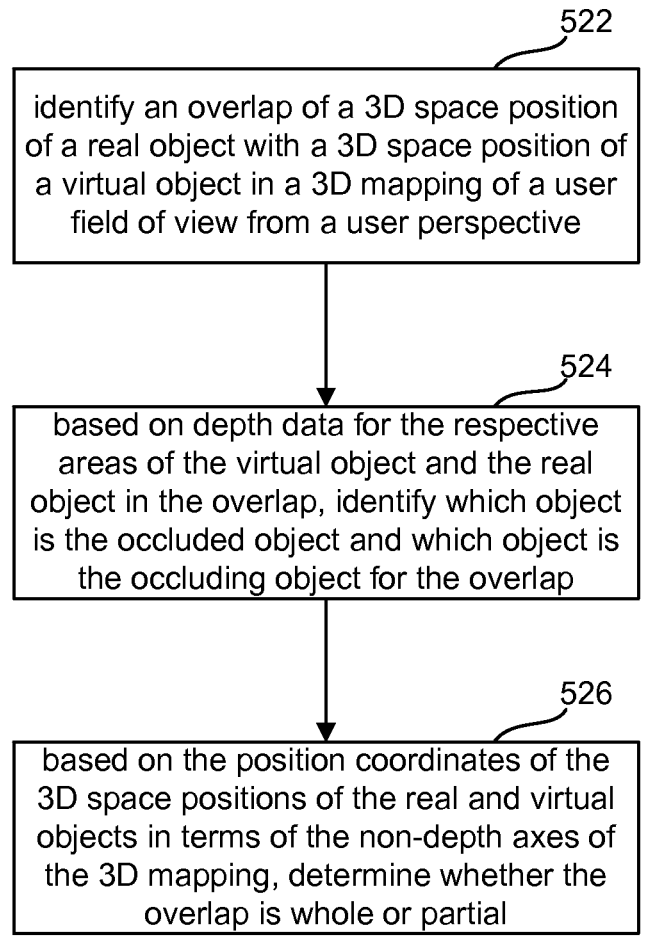
FIG. 5B is a flowchart of an implementation example for determining a spatial occlusion relationship between a virtual object and a real object in a user field of view of a head mounted, augmented reality display device based on 3D space positions for the objects.
Figure 5C:
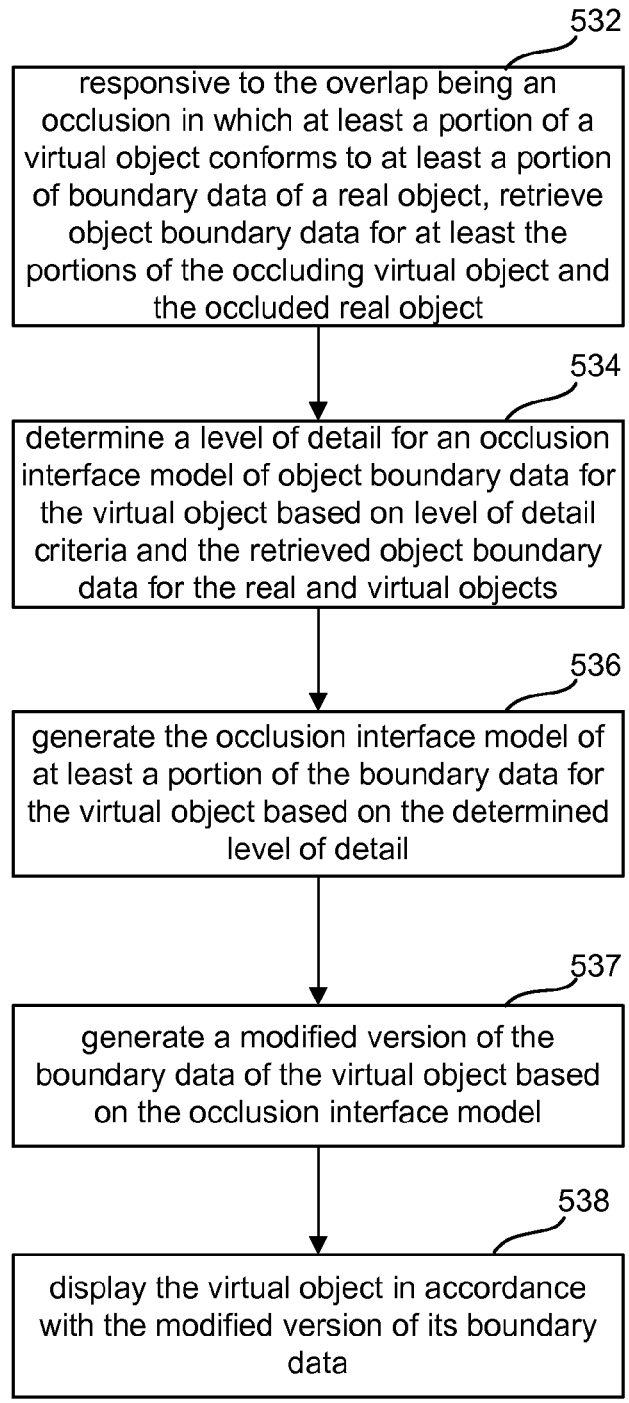
FIG. 5C is a flowchart of an embodiment of a method for displaying a realistic conforming occlusion interface between a real object occluded by a conforming virtual object by a head mounted, augmented reality display device system.

FIGS. 5A through 5C illustrate some embodiments which may be used to cause a see-through display or other head mounted display to represent the spatial occlusion relationship in the display by modifying display of the virtual object.

FIG. 5A is a flowchart of an embodiment of a method for displaying a realistic partial occlusion between a real object and a virtual object by a head mounted, augmented reality display device system. The occlusion engine in step 502 identifies a partial spatial occlusion between a real object and a virtual object based on their 3D space positions from a user perspective, and in step 506 retrieves object boundary data of an occluding portion of an occluding object in the partial occlusion. In step 508, the occlusion engine 302 determines a level of detail for a model, e.g. a geometrical model, representing a partial occlusion interface based on level of detail criteria, and in step 510, generates a model of the partial occlusion interface based on the retrieved object boundary data in accordance with the determined level of detail. In step 512, the occlusion engine 302 generates a modified version of the boundary data of the virtual object based on the model to include boundary data adjacent an unoccluded portion of the real object which has a shape based on the model of the partial occlusion interface. For example, the shape of the adjacent boundary data is like that of the model. The virtual engine data in step 514 causes the image generation unit to display an unoccluded portion of the virtual object in accordance with the modified version of its boundary data. A video-see HMD device may modify the embodiment of FIG. 5A in that steps 512 and 514 may be performed with respect to the occluding object, be it real or virtual, as a video-see display is not see through but displays image data of the real world which can be manipulated as well as image data of virtual objects. In other embodiments, a see-through display may take a hybrid approach and may modify at least a portion of a boundary of a real object and display its image data in accordance with the modified boundary portion.

FIG. 5B is a flowchart of an implementation example for determining a spatial occlusion relationship between a virtual object and a real object in a user field of view of a head mounted, augmented reality display device based on 3D space position data for the objects. In step 522, the occlusion engine 302 identifies an overlap of a 3D space position of a real object with a 3D space position of a virtual object in a 3D mapping of a user field of view from a user perspective. The occlusion engine 302 identifies, in step 524, which object is the occluded object and which object is the occluding object for the overlap based on depth data for the respective portions of the virtual object and the real object in the overlap. In step 526, the occlusion engine 302 determines whether the occlusion is whole or partial based on position coordinates of the 3D space positions of the real and virtual objects in terms of the non-depth axes of the 3D mapping.

In the case of whole occlusion, which type of object is occluded affects the occlusion processing. For example, the occlusion engine 302 can notify the virtual data engine 195 to not display a virtual object which is wholly occluded by a real object. In the case of a virtual object which entirely occludes a real object and the shape of the virtual object is not dependent on the shape of the real object, the occlusion engine 302 does not modify the boundary of the virtual object for this occlusion.

In some occlusions, whether partial or whole, a virtual object occludes at least a portion of a real object and conforms its shape to the shape of the real object. For example, a user may have designated a setting in his user profile 322 for his avatar to be displayed conforming to him to other display device systems 8 when a scene mapping engine 306 or higher level application 166 identifies that he is in a field of view of these other display device systems 8. The other viewers see the avatar instead of him from their respective perspectives, and the avatar mimics his movements.

FIG. 5C is a flowchart of an embodiment of a method for displaying a realistic conforming occlusion interface between a real object occluded by a conforming virtual object by a head mounted, augmented reality display device system. In step 532, responsive to the overlap being an occlusion in which at least a portion of a virtual object conforms to at least a portion of boundary data of a real object, the occlusion engine 302 retrieves object boundary data for at least the portions of the occluding virtual object and the occluded real object. In step 534, a level of detail for an occlusion version of boundary data for the virtual object is determined based on level of detail criteria and the retrieved object boundary data for the real and virtual objects. In step 536, the occlusion engine 302 generates the occlusion interface model of at least a portion of the boundary data for the virtual object based on the determined level of detail, and in step 537, generates a modified version of the boundary data of the virtual object based on the occlusion interface model. In step 538, the virtual data engine 195 displays the virtual object in accordance with the modified version of its boundary data.

FIGS. 6A, 6B, 6C and 6D describe examples of process steps for selecting a level of detail at which to display an occlusion interface based on different types of level of detail criteria including depth, display size, speed of the interface in the user field of view and positional relationship to a point of gaze.

Figure 6A:
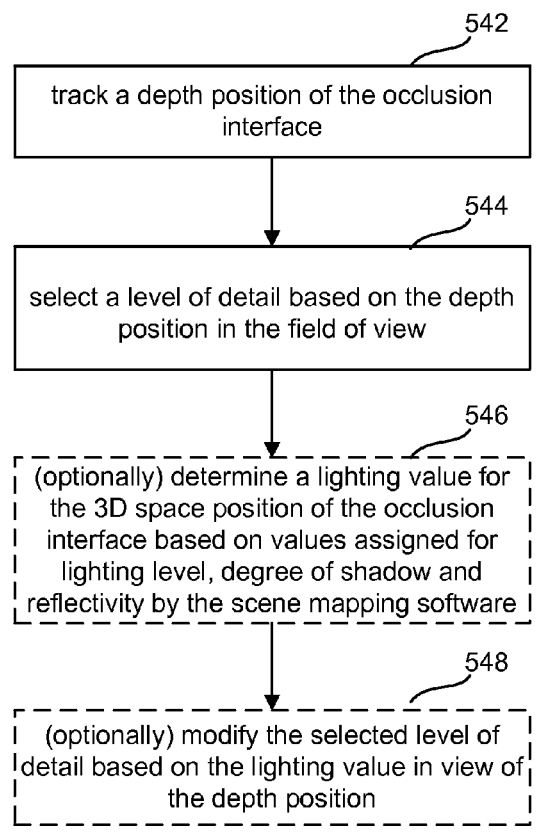
FIG. 6A is a flowchart of an implementation example for determining a level of detail for representing an occlusion interface based on level of detail criteria including a depth position of the occlusion interface.

FIG. 6A is a flowchart of an implementation example for determining a level of detail for representing either a partial occlusion interface or a conforming occlusion interface based on level of detail criteria including a depth position of the occlusion interface. The occlusion engine 302 in step 542 tracks a depth position of the occlusion interface in the user field of view, and in step 544, selects a level of detail based on the depth position in the field of view. Tracking a depth position includes monitoring changes in a depth position of each object or portions of each object in the occlusion in order to tell where the interface is and predict where it will be at a future reference time. In the case where depth cameras are available, the scene mapping engine updates positional values based on readings from depth sensors or depth cameras. Additionally, or in lieu of depth data or in supplement, the scene mapping engine can identify a depth change based on parallax determined based upon the positions of image elements, e.g. pixels, in image data of the same object captured separately from the front facing cameras 113.

Parallax shows an apparent difference in position of an object when viewed from at least two different lines of sight to the object, and is measured by an angle between the two lines. Closer objects have a higher parallax than distance objects. For example, when driving along a road with a tree, as his car nears the tree, parallax detected by the user's eyes for the tree increases. However, no parallax is detected for the moon in the sky because it is so far away even though the user is moving with respect to it. An increase or decrease in parallax can indicate a depth position change of the object. Additionally, a change in parallax can indicate a change in viewing angle.

A level of detail may be incremental as in continuous level of detail or there may be a respective distance range associated with each discrete level of detail in a set. An intersection distance between two discrete levels of detail may be identified as areas for the virtual data engine to apply level of detail transition techniques to avoid a "popping" effect as the modeling of the occlusion interface becomes more detailed. Some examples of such techniques are alpha blending or geomorphing.

As mentioned above, the level of detail selected identifies how accurately the occlusion interface is to be modeled to look as natural or realistic as if the virtual object in the spatial occlusion relationship were a real object. A level of detail may include a level of detail for a geometrical model of the occlusion interface. One example of a level of detail which may be selected for a geometrical model are rules for using at least part of a boundary of a pre-defined bounding geometrical shape like a circle, square, rectangle or triangle as a model or representation of the occlusion interface. In examples of higher levels of detail, geometry fitting such as line or curving fitting may be used to fit object boundary data points in the data set representing the occlusion interface and examples of accuracy criteria include smoothing criteria and percentage of object boundary data stored for the occlusion to be included in the resulting curve, line or other fitted geometrical shape or geometry produced by the fitting.

Another example of a level of detail is one which affects the detail of the boundary data of at least the real object in the occlusion. The boundary data for at least a real object in the occlusion is a bounding volume or occlusion volume. An application may be displaying virtual objects, and they are moving quickly or the user wearing the HMD is moving quickly, so occlusions are occurring rapidly. Less detailed bounding shapes facilitate quicker processing by taking advantage of human perceptual limitations in noticing the details of fast moving objects. For example, a tree's boundary data may be represented as a cyclinder, An ellipse may surround a person in the field of view. The conforming occlusion interface is modeled as at least a portion of the bounding volume for the real object. For partial occlusions, the use of bounding volumes as the boundary data will simplify interfaces. In step 506, if the tree is the occluding object, the object boundary data of an occluding portion retrieved is a portion of a cylinder. In step 534 of FIG. 5C for conforming interface processing, the cylinder boundary data is retrieved for the tree rather than a more detailed and realistic version of boundary data. In some embodiments, a virtual object can also be represented by a bounding volume which can further simplify interfaces.

At such a level of detail, occlusions may be processed based on depth map data such as may be captured from front facing cameras 113 as the bounding volumes may be assigned prior to refining boundaries and real object identification.

Another example of a display aspect which rules for a level of detail may govern is a respective gap tolerance between the real object and the virtual object meeting at an occlusion interface. The less fitted the geometrical representation is to the object boundary data, the more likely one or more gaps may result. For example, when a user's real fingers occlude sections of a virtual ball, the portions of the virtual ball between the fingers may be rendered to stop a short distance from the object boundary data representing the user's fingers resulting in a small gap. The real world or another virtual object behind the gap will be visible. A small gap at a partial occlusion interface is less distracting to human eyes than if the virtual ball portions overlapped the real fingers in the display. In FIG. 7A and FIG. 8A, the triangle model results in gaps as the dolphin is displayed adjacent the left and right sides respectively of the triangle sides 704 and 706.

In some embodiments, a level of detail may be included in the set in which the virtual object is allowed to be rendered without correcting for occlusion. Criteria which may allow this include that the display size of the partial occlusion interface is below the display element, e.g. picture element or pixel, resolution of the display. Another factor that also effects the level of detail is the number of edges or data points determined from the raw image data. In other embodiments, a very detailed level of detail may indicate to use the detected edges as the model for the partial occlusion interface to represent the interface resulting in a very detailed display.

Realism of the displayed occlusion is balanced against efficiency in updating the display to represent motion of the virtual objects and updating the 3D mapping of the user environment. Other level of detail criteria may include an efficiency factor representing a time in which the display of the occlusion is to be completed. Compliance with this factor may be determined based on status messages of available processing time for the various processing units, including graphics processing units, between the collaborating processors of the display device system 8 and one or more network accessible computer systems 12, and other display device systems 8 which make their excess processing power available. If processing resources are not available, a lower, less realistic level of detail than the depth position may warrant may be selected.

However, a hub computer system 12 or another display device system 8 may have already generated and stored a model representing a partial occlusion interface or a conforming occlusion interface and also the image data for rendering the occlusion interface for the same real object and virtual object at a level of detail. Particularly for occlusions with stationary real objects, an occlusion data set may store the model generated of a partial occlusion interface or a conforming occlusion interface at a certain level of detail, and the hub computer system 12 can retrieve the stored model and send it over a network to the display device system 8 having the same occlusion in its field of view at a depth position suitable for the level of detail. The display device system 8 can translate, rotate and scale the occlusion data for its perspective. The hub computing system 12 may also retrieve image data for the occlusion interface from another display device system and perform scaling, rotating or translation of the image data for the perspective of the display device system 8 as needed and send the modified image data to the display device system 8 which is in a format ready for processing by the image generation unit 120. The sharing of occlusion and image data can also make a more detailed level comply with the processing efficiency criteria.

Lighting and shadows affect the visibility of details. For example, at a certain depth position, more details of a real object may be visible in bright daylight than at night or in a shadow cast by another real or virtual object. Rendering an occlusion interface for a virtual object with the real object at a level of detail for bright daylight may be computationally inefficient on a cloudy, rainy day. Returning to FIG. 6A, in step 546, the occlusion engine 302 optionally determines a lighting value for the 3D space position of the occlusion interface based on values assigned for lighting level, degree of shadow and reflectivity by the scene mapping software, and in step 548, optionally, modifies the selected level of detail based on the lighting value in view of the depth position.

Figure 6B:
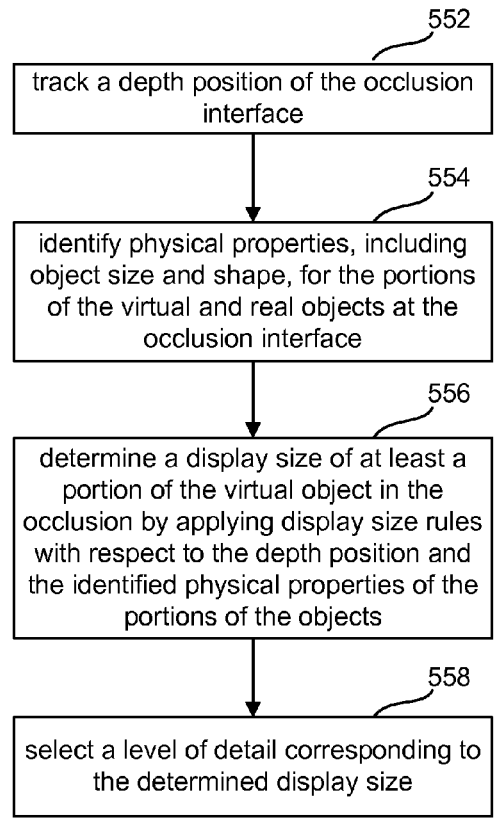
FIG. 6B is a flowchart of an implementation example for determining a level of detail for representing an occlusion interface based on level of detail criteria including a display size of the occlusion interface.

FIG. 6B is a flowchart of an implementation example for determining a level of detail for representing an occlusion interface based on level of detail criteria including a display size of the occlusion interface. In step 452, the occlusion engine 302 tracks a depth position of the occlusion interface, and in step 554 identify physical properties, including object size and shape, for the portions of the virtual and real objects at the occlusion interface, for example based on their respective associated object physical properties data sets $320_{NS}$.

A display size of the portion of the virtual object at the occlusion interface can be determined at step 556 by the virtual data engine 195 in response to a request by the occlusion engine 302 by calculating a display size based on the depth position, the identified physical properties of the portions of the objects including object size and shape, and a coordinate transformation to identify how many display elements (e.g. pixels or sub-pixels on the display) would represent the image of the occlusion interface on the display. For example, if the display size is significantly below the pixel resolution of the display, a level of detail which indicates no occlusion processing may be selected as the occlusion won't be visible, or hardly at all to justify the computational cost. In step 558, the occlusion engine 302 selects a level of detail corresponding to the determined display size.

Figure 6C:
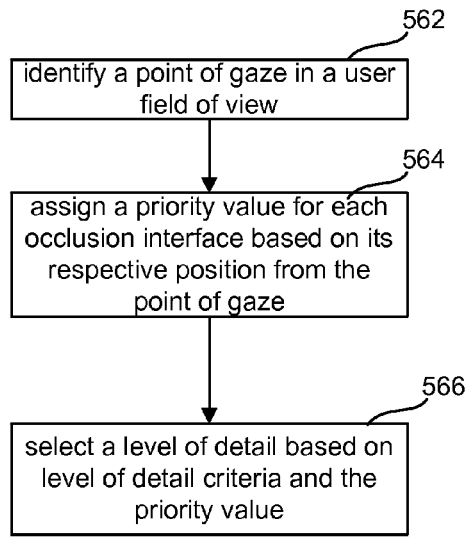
FIG. 6C is a flowchart of an implementation example for determining a level of detail for representing an occlusion interface based on level of detail criteria and a gaze priority value.

FIG. 6C is a flowchart of an implementation example for determining a level of detail for representing an occlusion interface based on level of detail criteria based on a gaze priority value. The eye tracking software 196, in step 562, identifies a point of gaze in a user field of view. For example, a point of gaze may be determined by detecting pupil positions of the user's eyes, extending lines of sight from each of the user's approximated retina locations based on eyeball models and identifying the intersection point of the lines of sight in the 3D mapped user field of view. The intersection point is a point of gaze which may be an object in the field of view. The point of gaze in a coordinate system may be stored in a memory location accessible by the other software for their processing. The occlusion engine 302, in step 564, assigns a priority value for each occlusion interface based on its respective position from the point of gaze, and in step 566, selects a level of detail for generating a model of the partial occlusion interface or the conforming occlusion interface based on level of detail criteria and the priority value. In some examples, the priority value may be based on a distance criteria from the point of gaze. In other examples, an occlusion interface positioned within the Panum's fusional area, the area of single vision for human binocular vision, may receive a higher priority value than those positioned outside the Panum's fusional area.

Figure 6D:
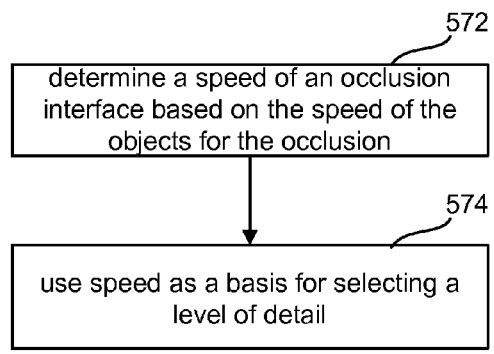
FIG. 6D is a flowchart of an implementation example for determining a level of detail using speed of the interface as a basis.

FIG. 6D is a flowchart of an implementation example for determining a level of detail using speed of the interface as a basis. The occlusion engine 302 in step 572 determines a speed of an occlusion interface based on the speed of the objects for the occlusion. The occlusion may be a predicted or future occlusion based on their speeds. In step 574, the occlusion engine 302 uses speed as a basis for selecting a level of detail. Like gaze and depth distance and display size, speed may be one of a plurality of factors considered in determining a level of detail for processing an occlusion. The higher the speed, the less detailed the occlusion processing, and no occlusion may be selected as a level if things are moving so fast.

Figure 7C:
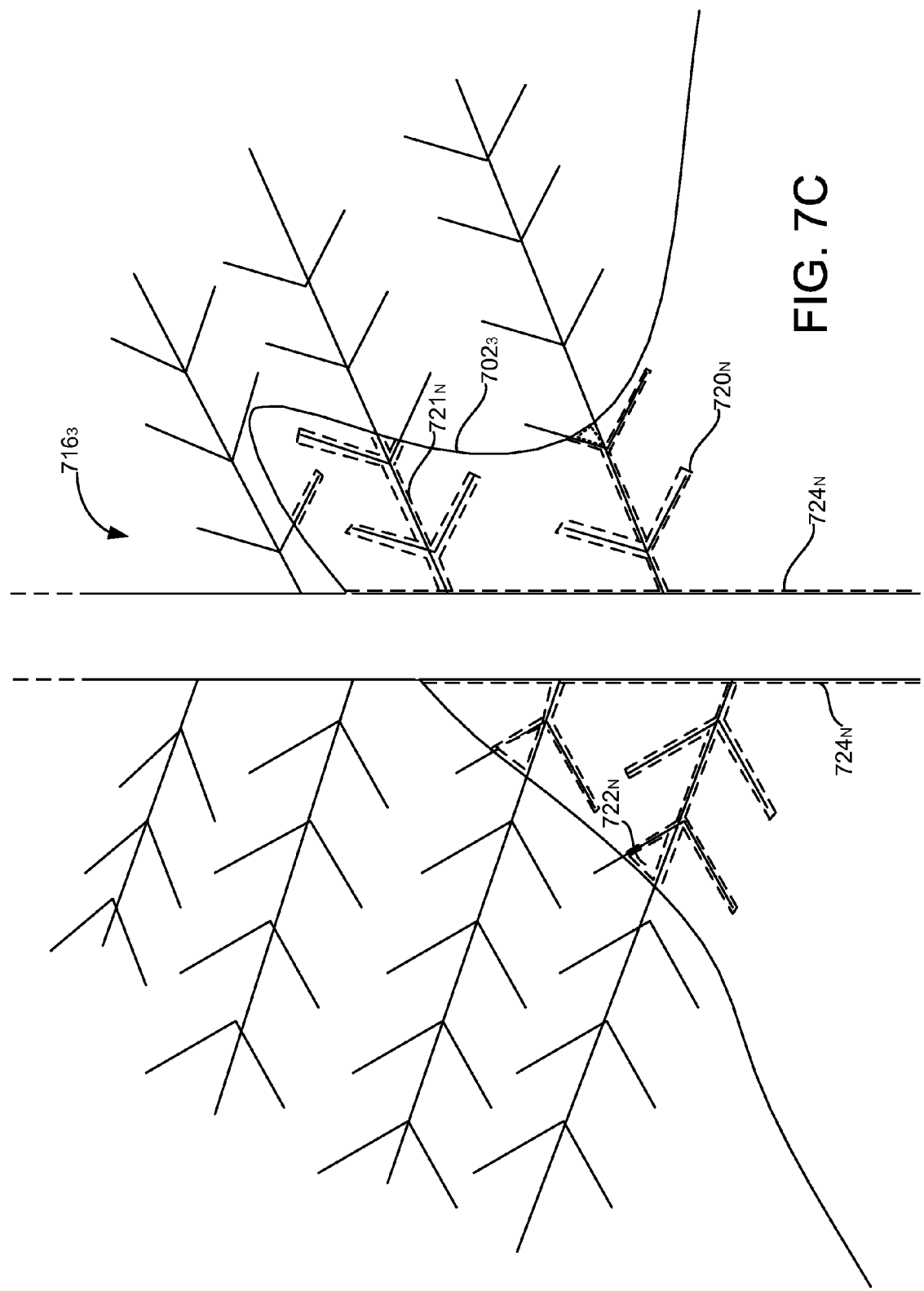
FIG. 7C illustrates an example of a level of detail using geometry fitting with a second accuracy criteria indicating a higher level of modeled detail.

Some geometry fitting techniques such as the examples above are applied to fit a line, a curve, or at least part of a boundary of a pre-defined geometrical shape to the boundary with accuracy criteria regulating the closeness of the fit. FIGS. 7A and 8A illustrate an example of using at least part of a boundary of a pre-defined geometrical shape by using sides of a triangle as models for the partial occlusion interfaces 704 and 706. FIGS. 7B and 8B illustrate examples of line fitting as a form of geometry fitting with a first accuracy criteria and FIG. 7C illustrates line fitting with a second accuracy criteria which has more accuracy. FIG. 8C is a reference image of the unmodified virtual object, a dolphin, in FIGS. 7A, 7B, 7C and 8A and 8C.

FIG. 7A illustrates an example of a level of detail using at least part of a boundary of a pre-defined bounding geometrical shape. FIG. 8A illustrates an example of partial occlusion interfaces modeled as triangle legs for the virtual object in FIG. 7A. For example, the pine tree $716_1$ in FIG. 7A is not a triangle but has a border including triangle like features. In FIG. 7A, with reference to FIG. 8C, a central portion including a fin is occluded by the pine tree. In this example, there are two partial occlusion interfaces which are modeled as sides of a triangle due to the depth of the virtual object and the pine tree. Due to the distance to the trees, a larger gap tolerance is permitted for this level of detail in this example between the end of the real branches and the beginning of the virtual dolphin sides.

As the user moves closer to the tree, by natural vision, the user will see more detail. Additionally, the image and depth sensors may also more accurately determine depth. Now, more of the shape of the real object pine tree is accounted for. FIG. 7B illustrates an example of a level of detail using geometry fitting with a first accuracy criteria. In FIG. 7B, a line fitting algorithm may be used with a smoothing criteria. For example, a smoothing criteria may indicate a maximum on how far the fitted geometry can be from the originally detected boundary data, e.g. points and edges, or a complexity level of a polygon, e.g. triangle vs. tetrahedron, can be used to represent a polygon mesh version of the object portion retrieved from a storage location after recognizing the object. The third, fourth, and fifth lower tiers of branches would be too far from a fitted line to not have their shape represented in the geometry of partial occlusion interfaces 708, 710 and 712. FIG. 8B illustrates the resulting partial occlusion interfaces 708, 710 and 712 which include indentations for space between the tiers of branches.

FIG. 7C illustrates an example of a level of detail using geometry fitting with a second accuracy criteria indicating a higher level of modeled detail. At a distance for FIG. 7C, a geometry fitting algorithm like curve or line fitting may be used to model the more detail detected boundary data of the tree which now includes branches with pine needles which can be seen through causing much more detail to be represented in the partial occlusion interfaces. In this example, as the dolphin swims around the pine tree, the user field of view is identified indicating the user is gazing through the branches in a section of the tree $716_3$ at the dolphin fin. In this example, the geometry fitting algorithm likely has more boundary data to work with from captured image and depth data, and accuracy criteria indicating lower tolerance for deviating from the boundary data. As the user moves toward the tree and the virtual dolphin $702_3$ keeps swimming, a partial occlusion interface keeps changing as well. At the time of this current field of view, the tree branches are in front of the dolphin. A number of representative partial occlusion interfaces are noted. Partial occlusion interfaces $724_N$ are representative of interfaces between the trunk of the tree and the dolphin between branches. Interface $721_N$ is representative of the occlusion interface of branch sections between pine needles. Interface $720_N$ is representative of the occlusion interface of pine needle sections on the branches which are in front of the dolphin in the user perspective.

Figure 7D:
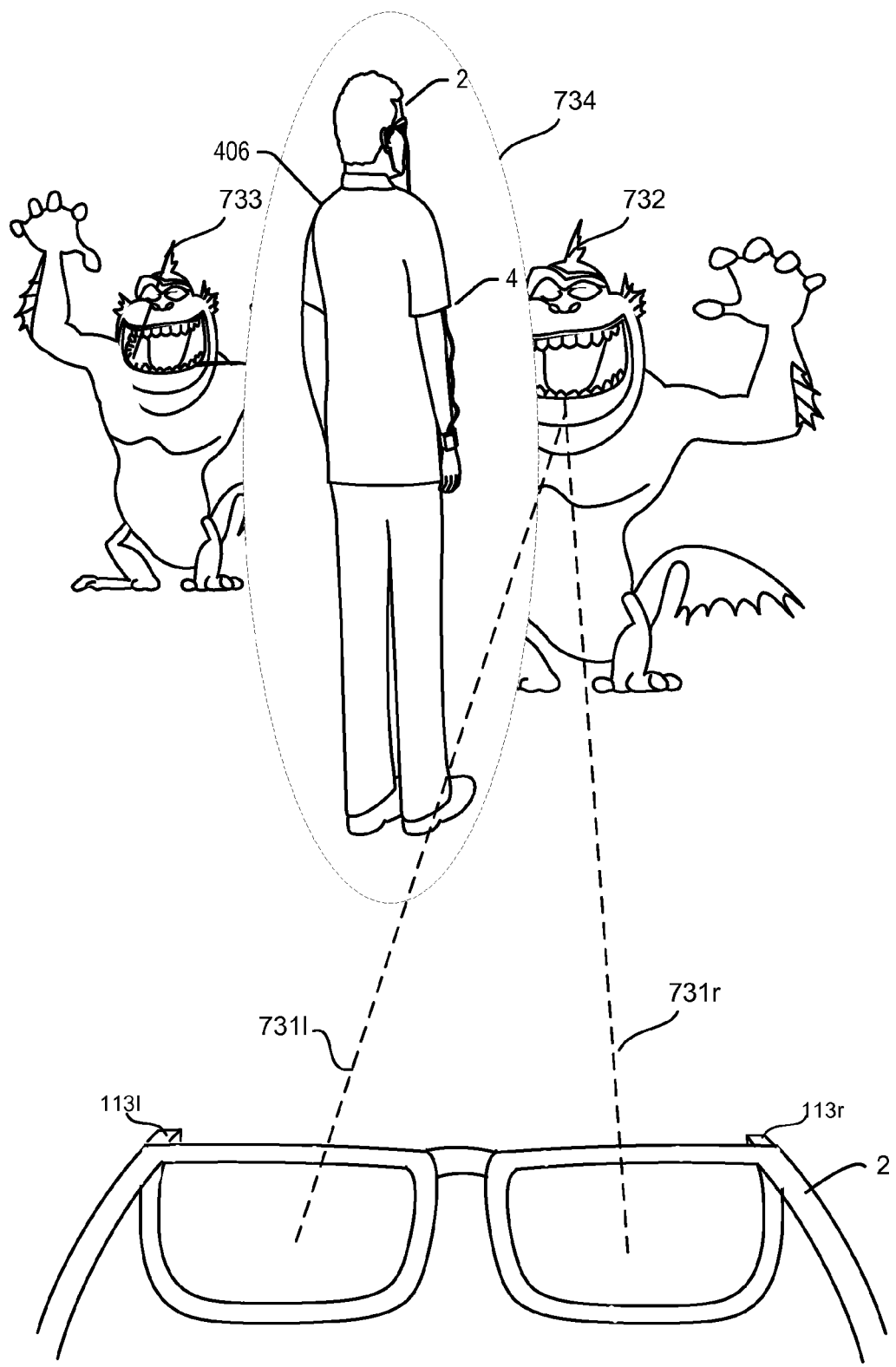
FIG. 7D illustrates an example of a level of detail using a bounding volume as boundary data for at least a real object.

FIG. 7D illustrates an example of a level of detail using a bounding volume as boundary data for at least a real object. In this example, a person, Bob 406, is being seen through a see-through display device 2, such as may be worn by George 408 in this example. George is gazing at virtual monster 732 as indicated by gaze lines 731$l$ and 731$r$ in this display frame. The monsters 732 and 733 are jumping around the room quickly, so the occlusion engine 302 is using a bounding volume of a predefined shape, an ellipse in this example, for tracking Bob based on depth map data as the monsters keeping jumping around through different display frames. Bob 406 is considered a real object though he may not be identified as a person yet by the object recognition engine 192. The occlusion engine 302 uses the ellipse in modeling the occlusion interface with the monsters. The monster 732 is cut off for display at the ellipse boundary rather than at Bob's right arm. Monster 733 similarly has a portion cut off or not displayed which is occluded by the ellipse. Due to the speed of the occlusions due to the monsters jumping around the room, a less detailed occlusion interface may be presented in accordance with level of detail criteria.

FIG. 9A illustrates an example of a real person to which a conforming virtual object is registered. A person in the user field of view, hereafter Sam, is wearing a T-shirt 804. Sam's body bulges out in his midsection, and these bulges represented by 806₁ and 806₂, on his T-shirt are noticeable up close. Sam is at an event where one can be seen wearing a virtual sweater indicating the college he attended. Sam's virtual sweater 902 conforms to Sam's body as clothing generally does. FIG. 9B illustrates examples of conforming occlusion interfaces modeled at a first level of detail with a first accuracy criteria for a virtual object. Another user wearing her see-through, augmented reality, display device system 8 has Sam facing her directly in her field of view less than 7 feet away. The dashed lines in FIGS. 9B and 9C indicate conforming and partial occlusion interfaces of the occluding virtual sweater 902 and the real object portions of Sam like his T-shirt 804, arms, shoulders and pants. Occlusion interface 910 is a conforming interface as the position of the volume or 3D space which the virtual shoulders of the sweater occupy is based on conforming to the shape and size of Sam's real shoulders. The lapels 908₁ and 908₂ of the sweater have partial occlusion interfaces with Sam's T-shirt 804 and pants. Sections of the lapels 906₁ and 906₂ take their shape based on Sam's mid-section shape which includes the bulges 806₁ and 806₂. Thus, the mid lapel sections 906₁ and 906₂ do not lie flat and follow the contours of the bulges. FIG. 9C illustrates an example of a conforming occlusion interface modeled with a second level of detail with a second accuracy criteria for a virtual object. In this current field of view, the wearer sees Sam again centered in her field of view but at least twice the distance away. Based on the distance, the boundary data of the virtual lapel sections 906₁ and 906₂ are not displayed and are replaced by smooth less detailed curves for smooth lying lapels 908₁ and 908₂ on Sam's sweater 902.

Figure 10:
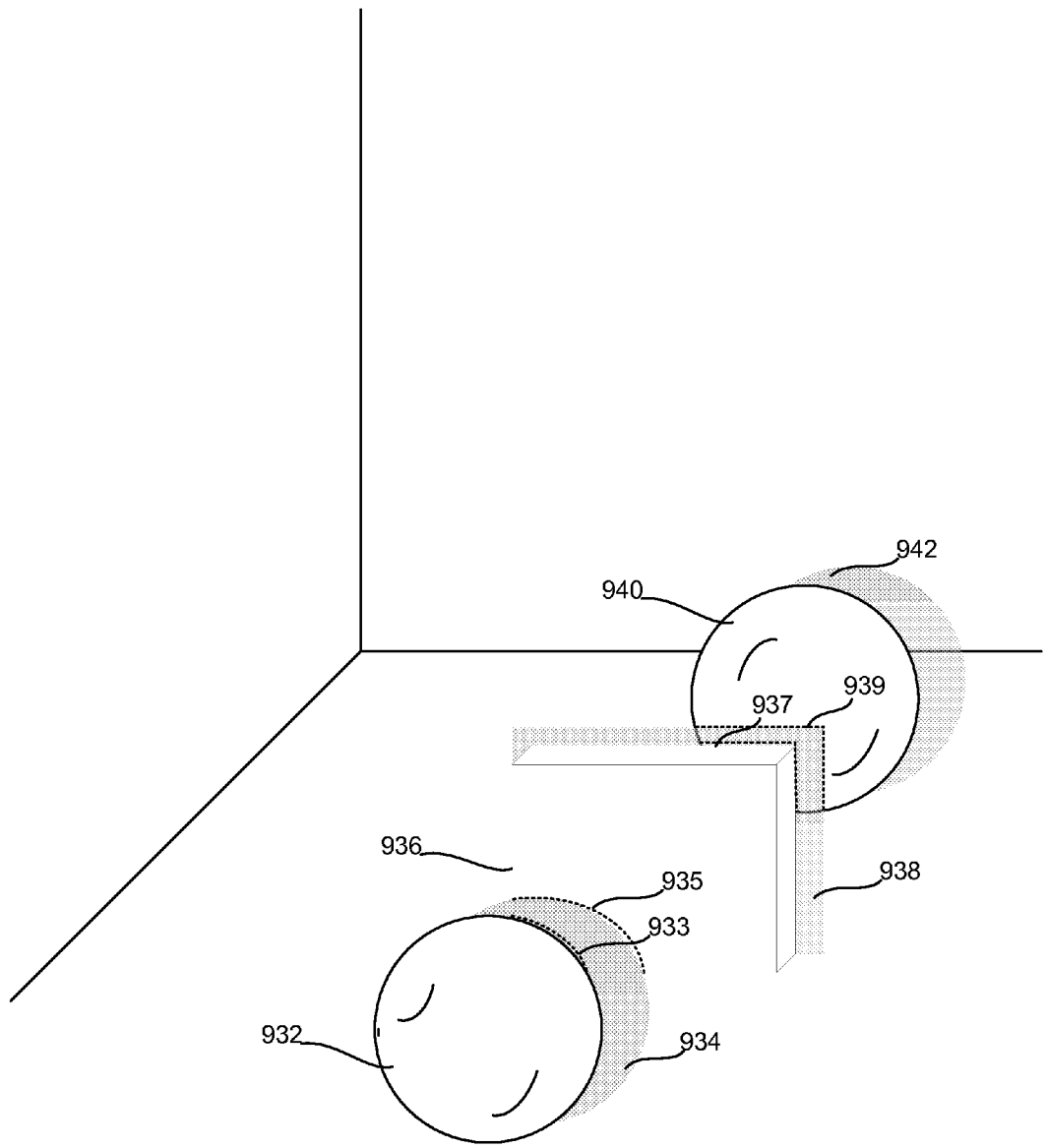
FIG. 10 illustrates examples of displaying shadow effects between occluding real and virtual objects.

An occlusion may cause a shadow, and shadow effects also affect how realistic an occlusion seems. FIG. 10 illustrates examples of displaying shadow effects between occluding real and virtual objects. A shadow of a virtual object can be displayed on a real object, and a virtual object can be displayed with the shadow of a real object appearing upon it. As discussed in U.S. patent application Ser. No. 12/905,952 entitled "Fusing Virtual Content Into Real Content", mentioned above, an area of shadow can be identified in display coordinates and an opacity filter 114 in front of the display optical systems 14 can adjust incoming light for those display coordinates to appear darker in some examples to give a shadow effect. Image data of a shadow can also be displayed to appear on a virtual or real object using conventional real-time shadow generation techniques. A position of a shadow of a real object can be determined by conventional shadow detection techniques used in image processing. Based on lighting detection techniques and the shadow detection techniques, the scene mapping engine 306 can determine a position of a shadow cast by a virtual object and whether the virtual object is to be displayed in shadow. In FIG. 10, spherical balls 932 and 940 are real objects and box 936 is a virtual object. The scene mapping engine 306 detects the shadow 934 for ball 932 and the shadow 942 for ball 940 from image and depth data captured of the user field of view by the front facing cameras 113 or other cameras in the environment. The scene mapping engine 306 updates the 3D mapping of the user field of view identifying the shadows, and other applications like the occlusion engine 302 and the virtual data engine 195 receive notice of the real shadow positions when they retrieve their next map updates. A 3D space position for virtual box 936 in the user field of view is determined, and the occlusion engine 302 determines the virtual box 936 is partially occluded by ball 932 and slightly occludes ball 940. The occlusion engine 302 determines whether there is shadow occlusion as well, meaning an occluding object is casting a shadow on the occluded object based on the shadow positions of the 3D mapping.

Based on lighting and shadow effects indicated by the scene mapping engine 306 in the map for the 3D space positions in which the balls and box are located, the occlusion engine 302 determines if shadows are generated by the occlusion and if a shadow is to be applied to an object in an occlusion relationship. Besides a partial occlusion interface 933, the engine 302 determines that a shadow of occluding real ball 932 extends to a surface of virtual occluded box 936. The occlusion engine can identify one or more shadow occlusion boundaries 935 for the virtual box 936 which indicates a portion of the virtual box to be in shadow. Shadow can have a transparency level which can be seen through. As mentioned above, a partial occlusion interface identified as being in shadow may receive a less detail level of detail for its modeling due to the shadow effects.

The occlusion engine 302 also identifies a partial occlusion interface 937 for the virtual box 936 occluding the real ball 940, and a shadow occlusion boundary 939 on the real ball 940. The virtual data engine 195 is notified of the modified boundary data due to the partial occlusion interfaces and the shadow occlusion boundaries for updating the display accordingly. Boundaries like polygon meshes and edges are not displayed typically. They are a basis used by the virtual data engine 195 for identifying shape and size information for image data.

Figure 11:
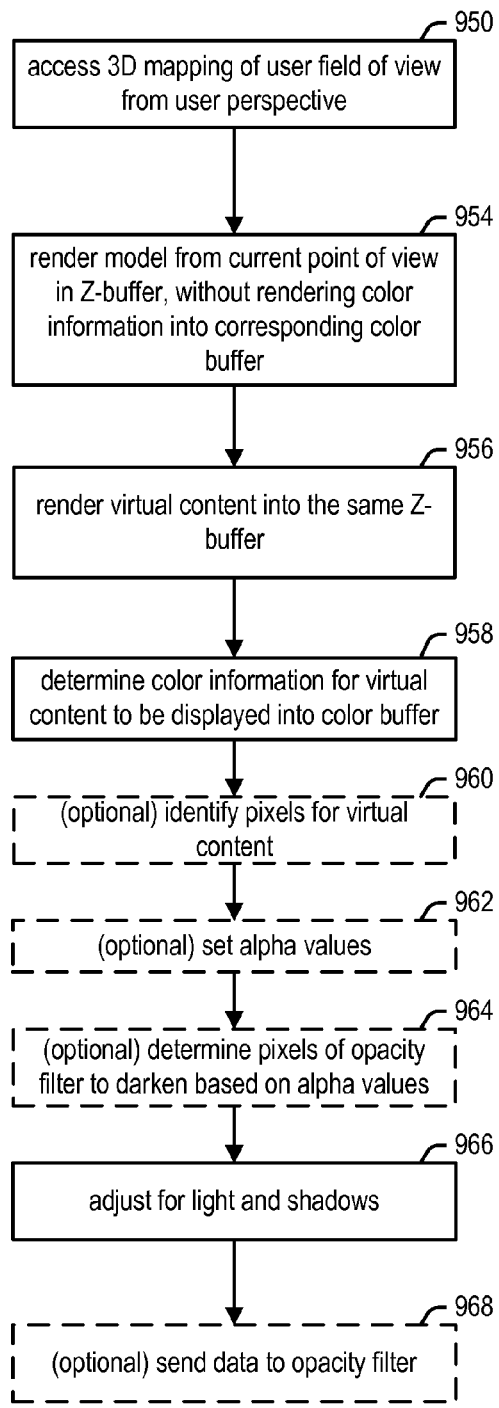
FIG. 11 is a flowchart describing an embodiment of a process for displaying one or more virtual objects in a user field of view of a head mounted, augmented reality display device.

FIG. 11 is a flowchart describing an embodiment of a process for displaying one or more virtual objects in a user field of view of a see-through, augmented reality display device, for example one like that in FIGS. 1A through 2B. Steps are described which may be performed by or for an opacity filter. The methods of FIGS. 11 and 12 may be performed in a display device system without an opacity filter 114 by not performing those steps related to the opacity filter. In step 950, the virtual data engine 195 accesses the 3D mapping of the user field of view from the user perspective. For a virtual image, such as may include a virtual object, the system has a target 3D space position of where to insert the virtual image.

In step 954, the system renders the previously created three dimensional model of the environment from the point of view of the user, the user perspective, of see-through, augmented reality display device 2 in a z-buffer, without rendering any color information into the corresponding color buffer. This effectively leaves the rendered image of the environment to be all black, but does store the z (depth) data for the objects in the environment. In step 956, virtual content (e.g., virtual images corresponding to virtual objects) is rendered into the same z-buffer. Steps 954 and 956 result in a depth value being stored for each pixel (or for a subset of pixels).

In step 958, the virtual data engine 195 determines color information for virtual content to be displayed into the corresponding color buffer. This determination may be performed in a number of ways. In some embodiments, a Z or depth test is performed for each pixel. The color information for a virtual object is selected if it is of a portion of the virtual object closer to the display device than any other object, real or virtual. In other words, the pixel corresponds to an unoccluded portion of a virtual object. In the case of a video-see display, the color information may be for a real unoccluded object as well as for a virtual unoccluded object. Back to the case of a see-through display, no color information is selected for the pixel if it corresponds to an occluded portion of a virtual object.

In some embodiments, the modified boundary data of a virtual object, determined and modeled based on an occlusion interface, may be used as a basis for selecting which color information for virtual content is written to which pixels. In other examples, the virtual content buffered for display are versions of the virtual content which already include any modifications to image data based on modified boundary data due to the occlusion processing of occlusion interfaces with respect to level of detail so the color information can simply be written to the color buffer for such virtual content. Any of these approaches effectively allow the virtual images to be drawn on the microdisplay 120 with taking into account real world objects or other virtual objects occluding all or part of a virtual object. In other words, any of these approaches can cause the see-through display to represent the spatial occlusion relationship in the display by modifying display of the virtual object.

As part of optional opacity processing, in optional step 960, the system identifies the pixels of microdisplay 120 that display virtual images. In optional step 962, alpha values are determined for the pixels of microdisplay 120. In traditional chroma key systems, the alpha value indicates how much of an alpha value is used to identify how opaque an image is, on a pixel-by-pixel basis. In some applications, the alpha value can be binary (e.g., on or off). In other applications, the alpha value can be a number with a range. In one example, each pixel identified in step 960 will have a first alpha value and all other pixels will have a second alpha value.

In optional step 964, the pixels of the opacity filter are determined based on the alpha values. In one example, the opacity filter has the same resolution as microdisplay 120 and, therefore, the opacity filter can be controlled using the alpha values. In another embodiment, the opacity filter has a different resolution than microdisplay 120 and, therefore, the data used to darken or not darken the opacity filter will be derived from the alpha value by using any of various mathematical algorithms for converting between resolutions. Other means for deriving the control data for the opacity filter based on the alpha values (or other data) can also be used.

In step 966, the images in the z-buffer and color buffer, as well as the alpha values and the control data for the opacity filter if used, are adjusted to account for light sources (virtual or real) and shadows (virtual or real). More details of step 966 are provided below with respect to FIG. 12. In step 968, the composite image based on the z-buffer and color buffer is sent to microdisplay 120. That is the virtual image is sent to microdisplay 120 to be displayed at the appropriate pixels, accounting for perspective and occlusions. In optional step 968, the control data for the opacity filter is transmitted from one or more processors of the control circuitry 136 or the processing unit to control opacity filter 114. Note that the process of FIG. 11 can be performed many times per second (e.g., the refresh rate).

Figure 12:
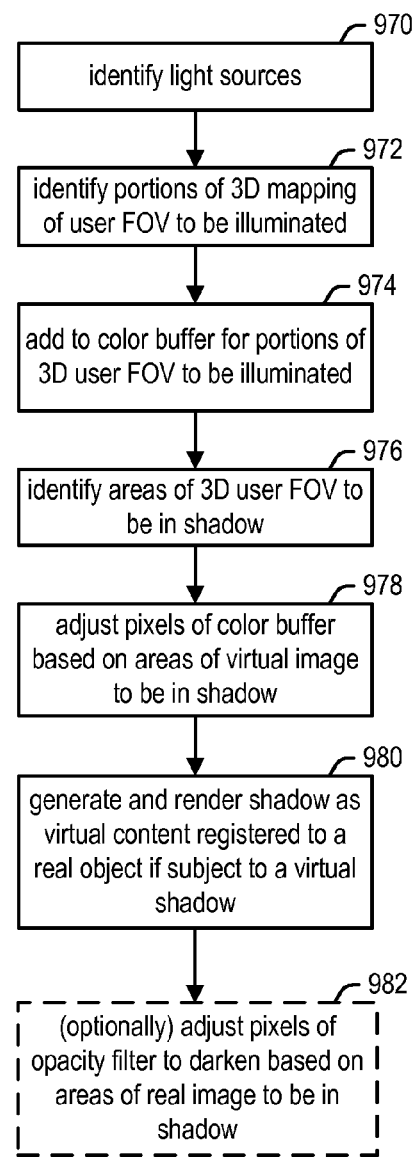
FIG. 12 is a flowchart describing an embodiment of a process for accounting for shadows.

FIG. 12 is a flowchart describing an embodiment of a process for accounting for light sources and shadows, which is an example implementation of step 966 of FIG. 11. In step 970, the scene mapping engine 306 identifies one or more light sources that need to be accounted. For example, a real light source may need to be accounted for when drawing a virtual image. If the system is adding a virtual light source to the user's view, then the effect of that virtual light source can be accounted for in the head mounted display device 2. For more details of other implementation process examples for changing lighting on real and virtual objects and additional ways of generating shadow effects, see "Display of Shadows via See-Through Display," having inventor, Matthew Lamb, filed on Dec. 12, 2011 and having U.S. patent application Ser. No. 13/323,403, and which application is hereby incorporated by reference in its entirety.

In step 972, the portions of the 3D mapping of the user field of view (including virtual images) that are illuminated by the light source are identified. In step 974, an image depicting the illumination is added to the color buffer described above.

In step 976, the scene mapping engine 306 and the occlusion engine 302, for shadows resulting from occlusions, identify one or more areas of shadow that need to be added by the virtual data engine 195, optionally with the aid of the opacity filter. For example, if a virtual image is added to an area in a shadow, then the shadow needs to be accounted for when drawing the virtual image by adjusting the color buffer in step 978. If a virtual shadow is to be added where there is no virtual image, then the occlusion engine 302 indicates a real object, a shadow occlusion interface on the real object and a transparency degree for the shadow upon which the virtual data engine 195 generates and renders shadow as virtual content which is registered to the real object if it is subject to a virtual shadow in step 980. Optionally, either as alternative or additionally, in step 982, the pixels of opacity filter 114 that correspond to the location of the virtual shadow are darkened.

As with different aspects of the methods discussed above, the different steps for displaying the partial occlusion interface may be performed solely by the see-through, augmented reality display device system 8 or collaboratively with one or more hub computing systems 12 alone or in combination with other display device systems 8.

Figure 13A:
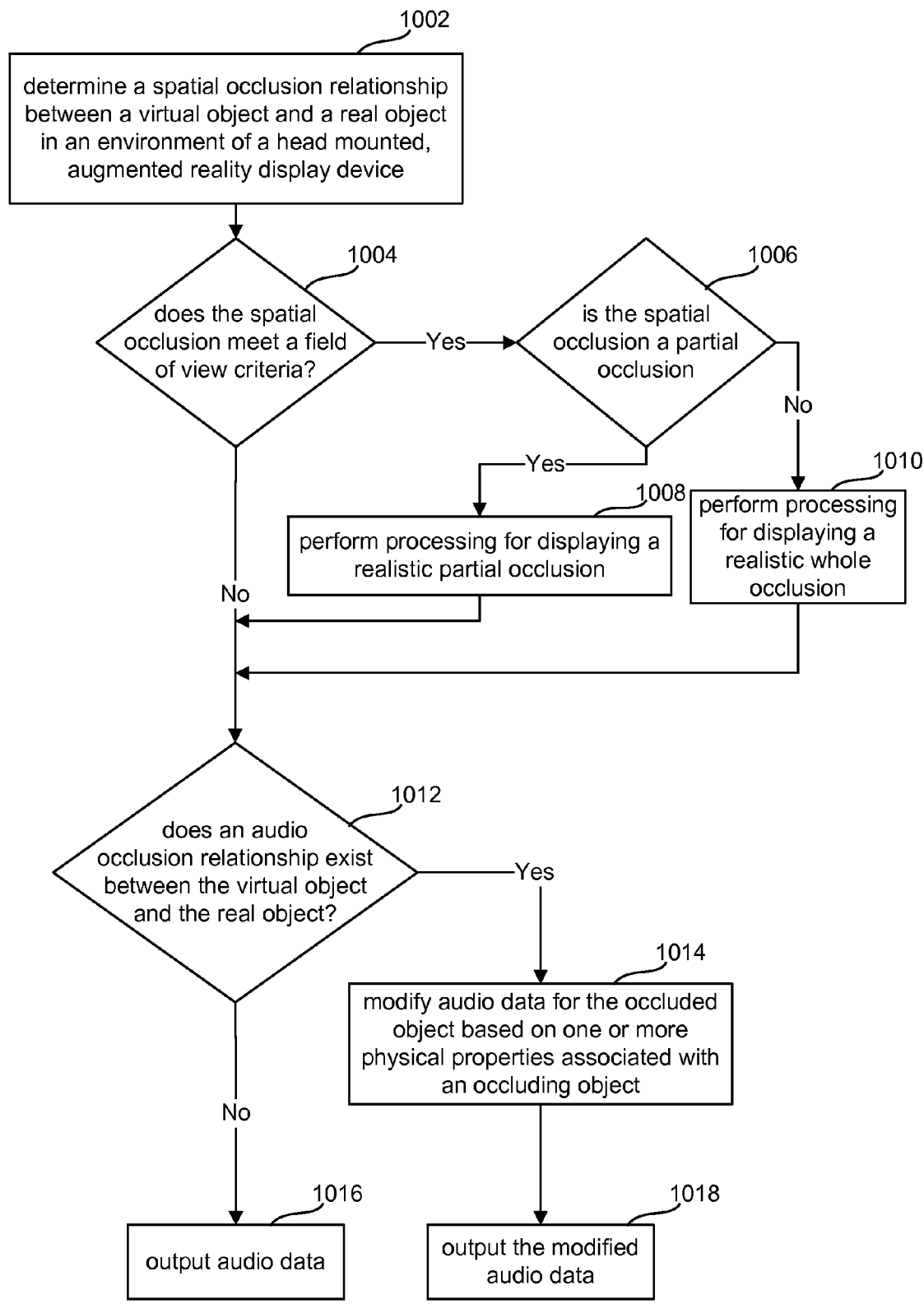
FIG. 13A is a flowchart of an embodiment of a method for providing realistic audiovisual occlusion between a real object and a virtual object by a head mounted, augmented reality display device system.

FIG. 13A is a flowchart of an embodiment of a method for providing realistic audiovisual occlusion between a real object and a virtual object by a head mounted, augmented reality display device system. In step 1002, the occlusion engine 302 determines a spatial occlusion relationship between a virtual object and a real object in an environment of a head mounted, augmented reality display device based on three dimensional data representing object volume or space positions. In step 1004, the occlusion engine 302 determines whether the spatial occlusion relationship meets a field of view criteria for the display device. Some examples of a field of view criteria are whether the occlusion is in the field view and a projected time at which the occlusion is expected to come into the field of view based on motion tracking data for the objects. If the occlusion meets the field of view criteria, a determination is made in step 1006 as to whether the spatial occlusion is a partial occlusion. Responsive to the occlusion being a partial occlusion, in step 1008, processing for displaying a realistic partial occlusion is performed. Otherwise in step 1010, processing is performed for displaying a realistic whole occlusion of one object by another.

If the spatial occlusion did not satisfy field of view criteria or the processing for displaying the spatial occlusion in the field of view is being or has been performed, a determination is made in step 1012 as to whether an audio occlusion relationship exists between the virtual object and the real object. If an audio occlusion relationship does not exist, the audio data is output in step 1016. If the audio occlusion relationship exists, then in step 1014 audio data for an occluded object in the relationship is modified based on one or more physical properties associated with an occluding object in the relationship, and the modified audio data is output in step 1018.

Figure 13B:
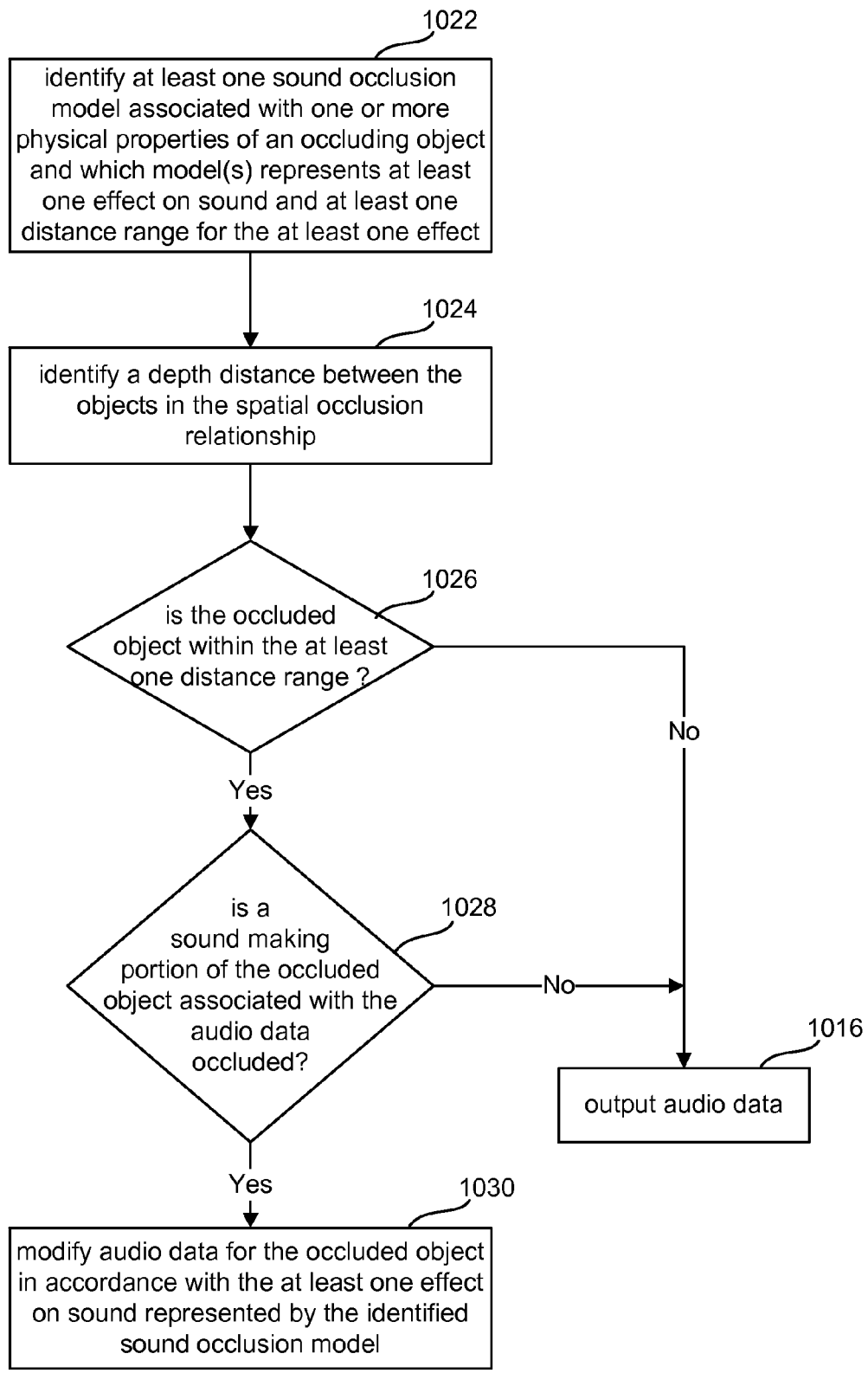
FIG. 13B is a flowchart of an implementation process example for determining whether an audio occlusion relationship between the virtual object and the real object exists based on one or more sound occlusion models associated with one or more physical properties of an occluding object.

FIG. 13B is a flowchart of an implementation process example for determining whether an audio occlusion relationship between the virtual object and the real object exists based on one or more sound occlusion models associated with one or more physical properties of an occluding object. In step 1022, the 3D audio engine 304 identifies at least one sound occlusion model associated with one or more physical properties of an occluding object and which model(s) represents at least one effect on sound and at least one distance range for the at least one effect. In step 1024, the 3D audio engine retrieves a depth distance between the objects in the spatial occlusion relationship and determines in step 1026 whether the occluded object is within the at least one distance range. If not, the audio data is output unmodified as in step 1016.

Responsive to the occluded object being within the at least one distance, the 3D audio engine 304 determines, in step 1028, whether a sound making portion of the occluded object associated with the audio data is occluded. Based on the object type of the object and the sound recognized as being made by the occluded object, the portion of the object which made the sound can be identified. From the 3D space position data of the occluded and occluding objects, whether the sound making portion is blocked or not can be determined. For example, if a partially occluded object is a person but the person's face is not blocked at all, there is no audio occlusion of voice data from the person.

Responsive to the sound making portion being occluded, in other words, blocked by the occluding object, in step 1030, the audio data is modified by the 3D audio engine 304 in accordance with the at least one effect on sound represented by the identified sound occlusion model and the 3D audio engine 304 performs step 1018 of outputting the modified audio data.

The example computer systems illustrated in the figures include examples of processor readable storage devices. Computer readable storage devices are also processor readable storage device. Such devices may include volatile and nonvolatile, removable and non-removable memory devices implemented in any method or technology for storage of information such as processor readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A see-through, augmented reality display device system for providing realistic occlusion comprising:
    a see-through, augmented reality display having a user field of view and being supported by a support structure of the see-through, augmented reality display device;
    at least one camera supported by the support structure for capturing image data and depth data for real objects in the user field of view of the see-through, augmented reality display;
    one or more processors communicatively coupled to the at least one camera for receiving image and depth data including the user field of view and to track depth positional data from the user field of view;
    the one or more processors for determining a spatial occlusion relationship between an occluding object and an occluded object, and determining a first level of detail criteria based on the positional data used in processing a level of occlusion for the occluding object, the occluding object and the occluded object including a real object and a virtual object, respectively, based on the image and depth data; and
    the one or more processors being communicatively coupled to the see-through, augmented reality display and the one or more processors causing the see-through display to represent the spatial occlusion relationship in the display by modifying display of the virtual object and causing the see-through display to provide varied levels of occlusion as determined by the first level of detail criteria when rendering the occluding object.

2. The system of claim 1 wherein the one or more processors causing the see-through display to represent the spatial occlusion relationship in the display by modifying display of the virtual object further comprises:
    determining a level of detail for generating a model of an occlusion interface between the real object and the virtual object based on a second level of detail criteria and generating a modified version of object boundary data for the virtual object based on the generated model; and
    the see-through, augmented reality display displaying the virtual object based on the modified version of its object boundary data.

3. The system of claim 1 further comprising:
    the one or more processors being communicatively coupled to one or more computer systems and the one or more processors and the one or more computer systems collaboratively determining a three-dimensional map of an environment of a user wearing the see-through, augmented reality display device system in real time in a common coordinate system based on image and depth data captured of the environment; and
    the one or more processors and the one or more computer systems sharing at least one occlusion data set including a model for an occlusion interface in real time.

4. The system of claim 3 further comprising wherein the one or more computer systems include at least one other see-through, augmented reality display device in the environment of the user which shares one or more occlusion data sets.

5. The system of claim 1 further comprising:
    earphones attached to the support structure;
    the one or more processors being communicatively coupled to the earphones for controlling output of audio data; and
    the one or more processors executing a three dimensional audio engine which modifies audio data for the occluded object in the spatial occlusion relationship based on one or more physical properties associated with the occluding object.

6. The system of claim 5 further comprising:
    the one or more processors having access to memory for storing one or more sound occlusion models which represent at least one effect on sound directed at an object based on one or more physical properties of the object; and
    the one or more processors executing a three dimensional audio engine which modifies audio data for the occluded object in the partial occlusion based on one or more physical properties associated with the occluding object further comprises:
    the one or more processors executing a three dimensional audio engine modifying the audio data in accordance with the at least one effect on sound represented by the identified sound occlusion model.

7. The system of claim 6 further comprising:
a microphone attached to the support structure;
the one or more processors being communicatively coupled to the microphone and receiving audio data from the microphone; and
the one or more processors identifying the audio data as being from the real object which is the occluded object, wherein;
the identified sound occlusion model is the sound occlusion model of the virtual object which is the occluding object.

8. The system of claim 1, wherein a tolerance level of the first level of detail is based on the positional data, the tolerance level indicating upper and lower boundaries for varying the level of detail.

9. A method of providing realistic occlusion in a see-through, augmented reality display, comprising:
capturing image data and depth data for real objects using at least one camera in a user field of view of the see-through, augmented reality display;
receiving image and depth data, at one or more processors communicatively coupled to the at least one camera, including the user field of view and tracking depth positional data from the user field of view;
determining, by the one or more processors, a spatial occlusion relationship between an occluding object and an occluded object, and determining a level of detail criteria based on the positional data used in processing a level of occlusion for the occluding object, the occluding object and the occluded object including a real object and a virtual object, respectively, based on the image and depth data; and
rendering the spatial occlusion relationship in the display, by the one or more processors communicatively coupled to the see-through augmented reality display, by modifying display of the virtual object and causing the see-through display to provide varied levels of occlusion as determined by the level of detail criteria when displaying the occluding object.

10. The method of claim 9 the rendering further comprises:
determining a level of detail for generating a model of an occlusion interface between the real object and the virtual object based on a second level of detail criteria and generating a modified version of object boundary data for the virtual object based on the generated model; and
displaying, by the see-through, augmented reality display, the virtual object based on the modified version of its object boundary data.

11. The method of claim 9 further comprising:
collaboratively determining, by the one or more processors and one or more computer systems, the one or more processors being communicatively coupled to the one or more computer systems, a three-dimensional map of an environment of a user wearing the see-through, augmented reality display device system in real time in a common coordinate system based on image and depth data captured of the environment; and
sharing at least one occlusion data set including a model for an occlusion interface in real time by the one or more processors and the one or more computer systems.

12. The method of claim 11 wherein the one or more computer systems include at least one other see-through, augmented reality display device in the environment of the user which shares one or more occlusion data sets.

13. The method of claim 9 further comprising:
controlling output of audio data by the one or more processors, the one or more processors being communicatively coupled to earphones; and
executing a three dimensional audio engine, by the one or more processors, which modifies audio data for the occluded object in the spatial occlusion relationship based on one or more physical properties associated with the occluding object.

14. The method of claim 13 further comprising:
storing one or more sound occlusion models, by in a memory accessible by the one or more processors, which represent at least one effect on sound directed at an object based on one or more physical properties of the object; and
executing by the one or more processors a three dimensional audio engine which modifies audio data for the occluded object in the partial occlusion based on one or more physical properties associated with the occluding object further comprises:
executing by the one or more processors a three dimensional audio engine modifying the audio data in accordance with the at least one effect on sound represented by the identified sound occlusion model.

15. The method of claim 14 further comprising:
receiving audio data from a microphone, the one or more processors being communicatively coupled to the microphone; and
identifying by the one or more processors the audio data as being from the real object which is the occluded object, wherein
the identified sound occlusion model is the sound occlusion model of the virtual object which is the occluding object.

16. The method of claim 9, wherein a tolerance level of the first level of detail is based on the positional data, the tolerance level indicating upper and lower boundaries for varying the level of detail.

17. A see-through, augmented reality display device system for providing realistic occlusion comprising:
a see-through, augmented reality display having a user field of view and being supported by a support structure of the see-through, augmented reality display device;
at least one camera supported by the support structure for capturing image data and depth data for real objects in the user field of view of the see-through, augmented reality display;
one or more processors communicatively coupled to the at least one camera for receiving image and depth data including the user field of view;
the one or more processors for determining a spatial occlusion relationship between an occluding object and an occluded object, the occluding object and the occluded object including a real object and a virtual object, based on the image and depth data;
the one or more processors being communicatively coupled to the see-through, augmented reality display and the one or more processors causing the see-through display to represent the spatial occlusion relationship in the display by modifying display of the virtual object;
earphones attached to the support structure;
the one or more processors being communicatively coupled to the earphones for controlling output of audio data;
the one or more processors executing a three dimensional audio engine which modifies audio data for the occluded object in the spatial occlusion relationship based on one or more physical properties associated with the occluding object;

the one or more processors having access to memory for storing one or more sound occlusion models which represent at least one effect on sound directed at an object based on one or more physical properties of the object; and the one or more processors executing a three dimensional audio engine which modifies audio data for the occluded object in the partial occlusion based on one or more physical properties associated with the occluding object further comprises:

the one or more processors executing a three dimensional audio engine modifying the audio data in accordance with the at least one effect on sound represented by the identified sound occlusion model.

18. The system of claim 17 further comprising:
a microphone attached to the support structure;
the one or more processors being communicatively coupled to the microphone and receiving audio data from the microphone; and the one or more processors identifying the audio data as being from the real object which is the occluded object, wherein the identified sound occlusion model is the sound occlusion model of the virtual object which is the occluding object.

19. The system of claim 17, wherein a tolerance level of the first level of detail is based on the positional data, the tolerance level indicating upper and lower boundaries for varying the level of detail.

20. The system of claim 17 wherein the one or more processors causing the see-through display to represent the spatial occlusion relationship in the display by modifying display of the virtual object further comprises:

determining a level of detail for generating a model of an occlusion interface between the real object and the virtual object based on a level of detail criteria and generating a modified version of object boundary data for the virtual object based on the generated model; and the see-through, augmented reality display displaying the virtual object based on the modified version of its object boundary data.

* * * * *